US010646813B2

(12) United States Patent
Landskron

(10) Patent No.: US 10,646,813 B2
(45) Date of Patent: May 12, 2020

(54) GAS SEPARATION APPARATUS AND METHODS USING SAME

(71) Applicant: LEHIGH UNIVERSITY, Bethlehem, PA (US)

(72) Inventor: Kai Landskron, Bethlehem, PA (US)

(73) Assignee: Lehigh University, Bethlehem, PA (US)

(*) Notice: Subject to any disclaimer, the term of this patent is extended or adjusted under 35 U.S.C. 154(b) by 337 days.

(21) Appl. No.: 15/714,515

(22) Filed: Sep. 25, 2017

(65) Prior Publication Data

US 2018/0085703 A1 Mar. 29, 2018

Related U.S. Application Data

(60) Provisional application No. 62/398,874, filed on Sep. 23, 2016.

(51) Int. Cl.
B01D 53/22 (2006.01)
B01D 53/04 (2006.01)
B01D 53/32 (2006.01)
H01G 11/06 (2013.01)
H01G 11/00 (2013.01)

(52) U.S. Cl.
CPC ......... *B01D 53/04* (2013.01); *B01D 53/0407* (2013.01); *B01D 53/323* (2013.01); *B01D 53/326* (2013.01); *B01D 2257/504* (2013.01); *B01D 2259/40083* (2013.01); *H01G 11/00* (2013.01); *H01G 11/06* (2013.01)

(58) Field of Classification Search
CPC ............ B01D 2257/504; B01D 53/326; B01D 53/04; B01D 53/323; H01G 11/06
See application file for complete search history.

(56) References Cited

U.S. PATENT DOCUMENTS

| 5,415,768 | A | 5/1995 | Andelman | |
|---|---|---|---|---|
| 8,665,581 | B2 | 3/2014 | Fleischer | |
| 8,749,952 | B2 | 6/2014 | Azais | |
| 8,968,546 | B2 | 3/2015 | Seed | |
| 10,403,447 | B2* | 9/2019 | Umetsu | H01G 11/28 |
| 2010/0090650 | A1* | 4/2010 | Yazami | H01M 10/443 |
| | | | | 320/132 |
| 2011/0240474 | A1 | 10/2011 | Seed | |
| 2011/0242731 | A1* | 10/2011 | Fleischer | H01G 11/36 |
| | | | | 361/502 |
| 2013/0157121 | A1* | 6/2013 | Tamachi | H01G 11/04 |
| | | | | 429/185 |
| 2014/0166499 | A1 | 6/2014 | Landskron | |
| 2014/0202880 | A1* | 7/2014 | Suss | B03C 9/00 |
| | | | | 205/758 |

(Continued)

FOREIGN PATENT DOCUMENTS

DE 19914100 9/2000

OTHER PUBLICATIONS

Apaydin, D. H. et al., "Direct Electrochemical Capture and Release of Carbon Dioxide Using an Industrial Organic Pigment: Quinacridone," Angew. Chem., Int. Ed. 2014, 53, pp. 6819-6822.

(Continued)

Primary Examiner — Anthony R Shumate
(74) Attorney, Agent, or Firm — FisherBroyles, LLP

(57) ABSTRACT

The present invention includes apparatuses and methods to separate a gas from a gaseous mixture using supercapacitive swing adsorption.

23 Claims, 16 Drawing Sheets

(56) References Cited

U.S. PATENT DOCUMENTS

| | | | | |
|---|---|---|---|---|
| 2016/0146895 | A1* | 5/2016 | Yazami | B60L 58/34 |
| | | | | 324/426 |
| 2018/0037478 | A1* | 2/2018 | Choi | C02F 1/4691 |
| 2019/0020030 | A1* | 1/2019 | Umetsu | H01M 10/0585 |
| 2019/0020034 | A1* | 1/2019 | Umetsu | H01G 11/24 |
| 2019/0027319 | A1* | 1/2019 | Umetsu | H01G 11/28 |
| 2019/0027321 | A1* | 1/2019 | Kusuzaka | H01G 11/34 |
| 2019/0027754 | A1* | 1/2019 | Kamijo | H01G 11/50 |
| 2019/0035560 | A1* | 1/2019 | Umetsu | H01G 11/70 |

OTHER PUBLICATIONS

Datta, S. et al., "Electrochemical CO2 Capture Using Resin-Wafer Electrodeionization," Ind. Eng. Chem. Res. 2013, 52, pp. 15177-15186.

Eisaman, M. D. et al., "Energy-efficient electrochemical CO2 capture from the atmosphere," Section Title: Air Pollution and Industrial Hygiene, 2009; pp. 175-178.

Ghezel-Ayagh, H. et al., "A novel system for carbon dioxide capture utilizing electrochemical membrane technology," ECS Trans. 2013, 51, pp. 265-272.

Kokoszka, B. et al., "Supercapacitive Swing Adsorption of Carbon Dioxide", Angew. Chem. Int. Ed., 2014, 53, 3698.

Licht, S. et al., "STEP carbon capture—The barium advantage," J. CO2 Util. 2013, 2, pp. 58-63.

Lindemann, D. and Riesel, L. "Fluorination of dioxa- and oxazaphospholanes," Z. Anorg. Allg. Chem. 1992, 615, pp. 66-72., with English language abstract.

Rau, G. H., "Electrochemical CO2 capture and storage with hydrogen generation," Energy Procedia 2009, 1, pp. 823-828.

Stern, M. C. et al., "Electrochemically mediated separation for carbon capture," Energy Procedia 2011, 4, pp. 860-867.

Stern, M. C. et al., "Post-combustion carbon dioxide capture using electrochemically mediated amine regeneration," Energy Environ. Sci. 2013, 6, pp. 2505-2517.

\* cited by examiner

GAS SEPARATION APPARATUS AND METHODS USING SAME

CROSS-REFERENCE TO RELATED APPLICATIONS

This application claims the benefit of priority under 35 U.S.C. § 119(e) of U.S. Provisional Patent Application No. 62/398,874, filed Sep. 23, 2016, the entire disclosure of which is hereby incorporated herein by reference.

BACKGROUND OF THE INVENTION

Industrial-scale gas separation can be performed using various techniques that allow for the enrichment or actual separation of a gas of interest. Swing adsorption techniques are based on processes in which controlled cycling of an experimental parameter allows for differential adsorption and release of a gas in a medium. Pressure swing adsorption (PSA) pressurizes and depressurizes gas around an adsorbent media to selectively adsorb certain components of a gas, allowing others to be selectively discarded. Vacuum swing adsorption (VSA) uses the same general principle as PSA, but swings between vacuum pressures and atmospheric pressure. The two techniques may be combined, and are called "vacuum pressure swing adsorption" (VPSA) in this case. Further, temperature swing adsorption (TSA) uses a similar technique to other swing adsorption techniques but cycles temperature instead of pressure. Cryogenic distillation is typically only used for very high volumes because of its nonlinear cost-scale relationship, which makes the process more economical at larger scales. Membrane technologies are not as well-developed as other gas separation techniques and as a result they are less widely used. Partially permeable membranes allow "fast" gases to pass through and be removed, while "slow" gases remain in the airstream and emerge without the original contaminants. However, manufacturing challenges mean the units are better suited for small to mid-scale operations.

PSA and TSA are often used in industrial settings, but have significant disadvantages, especially high energy consumption. This often prevents cost-effective large-scale gas separations, such as Gigaton-level carbon dioxide capture from the flue gas of coal-fired power plants. In fact, separating $CO_2$ from flue gas with known established PSA or TSA techniques would consume >30% of the power of a power plant. That large energy consumption would increase (about double) the price of electricity. Electrical and electrochemical approaches have been considered as alternative techniques to the classical PSA and TSA technologies. However, the techniques known in the art suffer from similar problems as TSA and PSA, namely, that there is a permanent electrical current flow which consumes a large amount of energy.

There is thus a need in the art for novel devices and methods that allow for energy-efficient gas separation in industrial scale. The present invention addresses this need.

SUMMARY OF THE INVENTION

The invention provides an apparatus for separating a gas at least partially from a gaseous mixture. The invention further provides methods of separating a first gas at least partially from at least one other gas in a gaseous mixture.

In one embodiments, the invention provides an apparatus for separating a first gas at least partially from a gaseous mixture, the apparatus comprising a gas permeable layer comprising the gaseous mixture comprising the first gas, a separator comprising an electrolyte, a first electrode and a second electrode, wherein:

the gas permeable layer is adapted and configured to allow for flow of the gaseous mixture and comprises a first surface and a second surface opposite to one another;

the first electrode comprises a first surface and a second surface opposite to one another;

the second electrode comprises a first surface and a second surface opposite to one another; and wherein:

the second surface of the gas permeable layer abuts the first surface of the first electrode;

the separator is disposed between, and in physical contact with, the second surface of the first electrode and the first surface of the second electrode;

wherein, when the first and second electrodes are capacitively charged by applying a voltage to the apparatus, the first gas is preferentially adsorbed in the apparatus from the gaseous mixture, and when the first and the second electrodes are capacitively discharged, the first gas is desorbed from the apparatus and vented from the apparatus via the gas permeable layer, whereby the first gas and the gaseous mixture do not undergo any electrochemical redox process, and whereby the first gas is at least partially separated from the gaseous mixture.

In certain embodiments, the apparatus further comprises a first current collector and a second current collector, wherein the first current collector abuts and spans the first surface of the gas permeable layer, and wherein the second current collector abuts and spans the second surface of the second electrode.

In certain embodiments, the apparatus further comprises a first corrosion resistant layer, a second corrosion resistant layer, a first current collector and a second current collector, wherein:

the first corrosion resistant layer comprises a first surface and a second surface opposite to one another;

the second corrosion resistant layer comprises a first surface and a second surface opposite to one another; and wherein the first current collector abuts and spans the first surface of the first corrosion resistant layer, the second surface of the first corrosion resistant layer abuts and spans the first surface of the gas permeable layer, the first surface of the second corrosion resistant layer abuts and spans the second surface of the second electrode and the second current collector abuts and spans the second surface of the second electrode.

In another embodiment, the invention provides an apparatus for separating a first gas at least partially from a first gaseous mixture and a second gas from a second gaseous mixture, the apparatus comprising a first gas permeable layer comprising the first gaseous mixture comprising the first gas, a second gas permeable layer comprising the second gaseous mixture comprising the second gas, a separator comprising an electrolyte, a first electrode and a second electrode, wherein:

the first gas permeable layer is adapted and configured to allow for flow of the first gaseous mixture and comprises a first surface and a second surface opposite to one another;

the second gas permeable layer is adapted and configured to allow for flow of the second gaseous mixture and comprises a first surface and a second surface opposite to one another;

the first electrode comprises a first surface and a second surface opposite to one another;

the second electrode comprises a first surface and a second surface opposite to one another; and wherein:

the second surface of the gas permeable layer abuts the first surface of the first electrode;

the first surface of the second gas permeable layer abuts the second surface of the second electrode;

the separator is disposed between, and in physical contact with, the second surface of the first electrode and the first surface of the second electrode;

wherein, when the first and second electrodes are capacitively charged by applying a voltage to the apparatus, the first gas is preferentially adsorbed into the first electrode from first the gaseous mixture and the second gas is preferentially adsorbed in to the second electrode from the second gaseous mixture, and when the first and the second electrodes are capacitively discharged, the first gas and second gas are desorbed from the apparatus and vented from the apparatus via the first gas permeable layer and second gas permeable layer respectively, whereby the first gas, second gas, first gaseous mixture and second gaseous mixture do not undergo any electrochemical redox process, and whereby the first gas is at least partially separated from the first gaseous mixture and the second gas is at least partially separated from the second gaseous mixture.

In certain embodiments, the apparatus further comprises a first current collector and a second current collector, wherein the first current collector abuts and spans the first surface of the gas permeable layer, and wherein the second current collector abuts and spans the second surface of the second gas permeable layer.

In other embodiments, the apparatus further comprises a first corrosion resistant layer, a second corrosion resistant layer, a first current collector and a second current collector, wherein:

the first corrosion resistant layer comprises a first surface and a second surface opposite to one another;

the second corrosion resistant layer comprises a first surface and a second surface opposite to one another; and wherein the first current collector abuts and spans the first surface of the first corrosion resistant layer, the second surface of the first corrosion resistant layer abuts and spans the first surface of the gas permeable layer, the first surface of the second corrosion resistant layer abuts and spans the second surface of the second gas permeable layer and the second current collector abuts and spans the second surface of the second electrode.

In certain embodiments, the gas permeable layer(s) comprise an electrically conducting material that is permeable to the gaseous mixture. In other embodiments, the gas permeable layer(s) comprises at least one selected from the group consisting of a carbon cloth, carbon mesh, carbon felt, carbon paper, metallic foam, metallic mesh, and metallic paper. In other embodiments, the gas permeable layer(s) comprises at least one selected from the group consisting of titanium foam and titanium mesh.

In certain embodiments, the gas permeable layer(s) comprises a solid electrically conducting material comprising one or more fluidic channels that allow for gaseous flow between the gas permeable layer and the abutting electrode surface. In other embodiments, the gas permeable layer(s) comprises one or more materials selected from the group consisting of graphite, titanium, gold, silver, platinum, electrically conducting polymers, stainless steel, electrically conducting ceramics and any combinations thereof. In yet other embodiments, the gas permeable layer(s) further comprises one or more materials selected from corrosion resistant plastics, corrosion resistant ceramics and any combinations thereof.

In certain embodiments, the first and second electrodes independently comprise at least one selected from the group consisting of high surface area carbon, porous metals, electrically conducting porous metal-organic frameworks, and electrically conducting porous polymers. In certain embodiments, the first and second electrodes independently comprise at least one selected from the group consisting of activated carbon, titanium, copper, silver, gold, steel, aluminum and TP-COF. In other embodiments, the first and second electrodes do not comprise any compounds capable of catalytically oxidizing or reducing a gas contained within the gaseous mixture. In certain embodiments, the first electrode and the second electrode are electrically connected with a variable voltage source.

In certain embodiments, the separator comprises at least one material selected from the group consisting of polypropylene, polyethylene, and cellulose. In other embodiments, the electrolyte comprises at least one selected from the group consisting of an aqueous salt solution, ionic liquid, and organic solvent-containing salt solution.

In certain embodiments having a single gas permeable layer, the apparatus further comprises at least one gas inlet and at least one gas outlet wherein the at least one gas inlet and at least one gas outlet are in fluidic communication with the gas permeable layer. In other embodiments having two gas permeable layers, the apparatus further comprises at least two gas inlets and at least two gas outlets wherein at least one gas inlet and at least one gas outlet are in fluidic communication with the first gas permeable layer and at least one gas inlet and at least one gas outlet are in fluidic communication with the second gas permeable layer.

In certain embodiments, the first and second current collectors independently comprise a metal layer, plate and/or sheet. In other embodiments, the first and second current collectors independently comprise one or more materials selected from the group consisting of carbon, titanium, steel, gold, silver, platinum, palladium, aluminum, copper, lead, tin, polymers, plastics, ceramic and electrically conducting polymers and any combinations thereof. In other embodiments, the first and the second current collectors are electrically connected with a variable voltage source.

In certain embodiments, the first and second corrosion resistant layers independently comprise one or more materials selected from the group consisting of graphite, titanium, gold, silver, platinum, electrically conducting polymers, stainless steel, alloy steel, electrically conducting ceramics, electrically conducting plastics and any combinations thereof. In other embodiments, the first and second corrosion resistant layers independently further comprise one or more materials selected from the group consisting of corrosion resistant plastics, corrosion resistant ceramics and any combinations thereof.

In certain embodiments, the apparatus further comprises a gasket. In certain embodiments, the gasket has a thickness that is approximately the sum of the thicknesses of the gas permeable layer(s), first electrode, second electrode and separator, wherein the gasket is in physical contact with the second surface of the first corrosion resistant layer and the first surface of the second corrosion resistant layer, and surrounds the length and width dimensions of the gas permeable layer(s), the first and second electrodes and the separator, whereby the system formed by the gasket and first and second corrosion resistant layers is sealed against liquid and/or gas exchange, except through the gas inlet(s) and gas outlet(s). In other embodiments, the gasket has a thickness that is approximately the sum of the thickness of the gas permeable layer(s), first electrode, second electrode, first and second corrosion resistant layers (if present) and separator, wherein the gasket is in physical contact with the first current collector and second current collector, and surrounds the length and width dimensions of the gas permeable layer(s), first electrode, second electrode, first and second corrosion resistant layers (if present) and separator whereby the system formed by the gasket and first and second corrosion resistant layers is sealed against liquid and/or gas exchange, except through the gas inlet(s) and gas outlet(s).

The invention also provides a method of separating a first gas at least partially from at least one other gas in a gaseous mixture, the method comprising flowing the gaseous mixture through an apparatus of the invention, wherein a varying voltage is applied to the apparatus, wherein the first and second electrodes are charged capacitively and the first gas and any of the other gases in the gaseous mixture do not undergo any electrochemical redox process. In certain embodiments, the first gas and the at least one other gas have different adsorptivities within the apparatus when the voltage is applied to the apparatus.

The invention further provides a system for separating at least one gas from a gaseous mixture, the system comprising at least two of the apparatuses of the invention connected in series, whereby the gas permeable layers of each apparatus are in fluidic communication.

The invention further provides a device for separating a gas at least partially from a gaseous mixture, the device comprising at least two of the apparatuses of the invention a gas feed and a multi-way valve, wherein the gas feed is in fluidic communication with the multi-way valve which is in fluidic communication with the at least two apparatuses, such that the multi-way valve directs gas flow from the gas feed to a single apparatus at any time. In certain embodiments, the at least two apparatuses are electrically connected such that an applied voltage can be shuttled from one apparatus to another.

BRIEF DESCRIPTION OF THE DRAWINGS

The following detailed description of various embodiments of the invention will be better understood when read in conjunction with the appended drawings. For the purpose of illustrating the invention, certain embodiments are shown in the drawings. It should be understood, however, that the invention is not limited to the precise arrangements and instrumentalities of the embodiments shown in the drawings.

FIG. 1B further depicts the inclusion of first and second corrosion resistant layers. FIGS. 1C and 1D depict diagrams of exemplary apparatuses analogous to FIGS. 1A and 1B, respectively, further depicting the inclusion of a second gas permeable layer.

FIG. 6E is the graph of $CO_2$ concentration of an outflow stream over time after being flowed over an electrode under no applied voltage, flowed at a rate of 0.1 cc $min^{-1}$. FIGS. 6F and 6G are graphs of $CO_2$ concentration of an outflow stream over time after being flowed at a flow rate of 0.1 cc $min^{-1}$ over an electrode (cathode) with mass 0.29 g with an applied voltage of 1V. As can be seen in FIGS. 6F and 6G, under an applied voltage, the electrode adsorbs $CO_2$ for the first 20 minutes until reaching saturation.

FIGS. 8A and 8B illustrate an exemplary flow scheme of a gas separation system operating on the basis of supercapacitance wherein FIG. 8A depicts a first state wherein supercapacitive swing adsorption (SSA) apparatus 801 is in a charged state and SSA apparatus 802 is in an uncharged state and FIG. 8B depicts a second state wherein SSA apparatus 801 is in an uncharged state and SSA apparatus 802 is in a charged state.

DETAILED DESCRIPTION OF THE INVENTION

In one aspect, the invention provides devices and methods for gas separation based on selective gas adsorption. The gas separation technologies, devices, and methods provided herein use, in certain embodiments, supercapacitive swing adsorption ("SSA").

A supercapacitor (also known as electric double-layer capacitor) is a capacitor with capacitance values much higher than other capacitors (but lower voltage limits). They typically store 10 to 100 times more energy per unit volume or mass than electrolytic capacitors, can accept and deliver charge much faster than batteries, and tolerate a much higher number charge and discharge cycles than rechargeable batteries.

Supercapacitors do not use the conventional solid dielectric of ordinary capacitors, but rather electrostatic double-layer capacitance, electrochemical pseudocapacitance, or a combination of both instead. Electrostatic double-layer capacitors use carbon electrodes or derivatives with much higher electrostatic double-layer capacitance than electrochemical pseudocapacitance, achieving separation of charge in a Helmholtz double layer at the interface between the surface of a conductive electrode and an electrolyte. Electrochemical pseudocapacitors use metal oxide or conducting polymer electrodes with a high amount of electrochemical pseudocapacitance. Pseudocapacitance is achieved by Faradaic electron charge-transfer with redox reactions, intercalation or electrosorption. Hybrid capacitors, such as the lithium-ion capacitor, use electrodes with differing characteristics: one exhibiting mostly electrostatic capacitance and the other mostly electrochemical capacitance.

Devices

Exemplary gas separation apparatuses in accordance with the present invention, which operate on the basis of supercapacitance, are illustrated herein. In certain embodiments, the apparatus comprises apparatuses that are combined to form systems that are able to separate gases in a continuous gas stream. In other embodiments, the apparatuses and systems in accordance with the present invention use supercapacitance to separate gases.

Figure 1A:
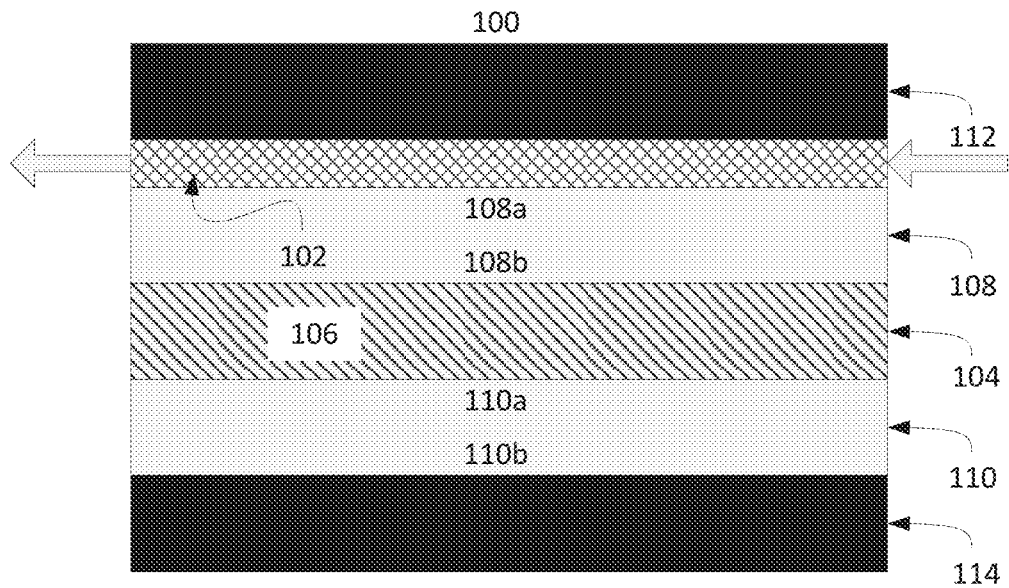
FIGS. 1A-1D are diagrams of exemplary apparatuses in accordance with the present invention including first and second current collectors, first and second electrodes, a separator comprising an electrolyte and a gas permeable layer.

Referring now to FIG. 1A, the gas separation apparatus 100 in accordance with the present invention comprises a gas permeable layer 102, a separator 104 comprising an electrolyte 106, a first electrode 108, a second electrode 110, a first current collector 112 and a second current collector 114. The first electrode 108 comprises a first surface 108a and a second surface 108b, wherein the first surface 108a and the second surface 108b are opposite to each other. The second electrode 110 comprises a first surface 110a and a second surface 110b, wherein the first surface 110a and the second surface 110b are opposite to each other. In certain embodiments, the first electrode 108, second electrode 110 and separator 104 have approximately identical length and width dimensions. The gas permeable layer 102 can be situated adjacent to and in physical contact with the first surface 108a of the first electrode 108. The separator 104 can be situated between and in physical contact with, the second surface 108b of the first electrode 108 and the first surface 110b of the second electrode 110. The apparatus further comprises a first current collector 112 in electrical communication with the first electrode 108 and a second current collector 114 in electrical communication with the second electrode 110. In certain embodiments, the first current collector 112 is in physical contact and spans the gas permeable layer distal to the first surface 108a of the first electrode 108 and the second current collector 114 is in physical contact and spans the second surface 110b of the second electrode 110.

Figure 1B:
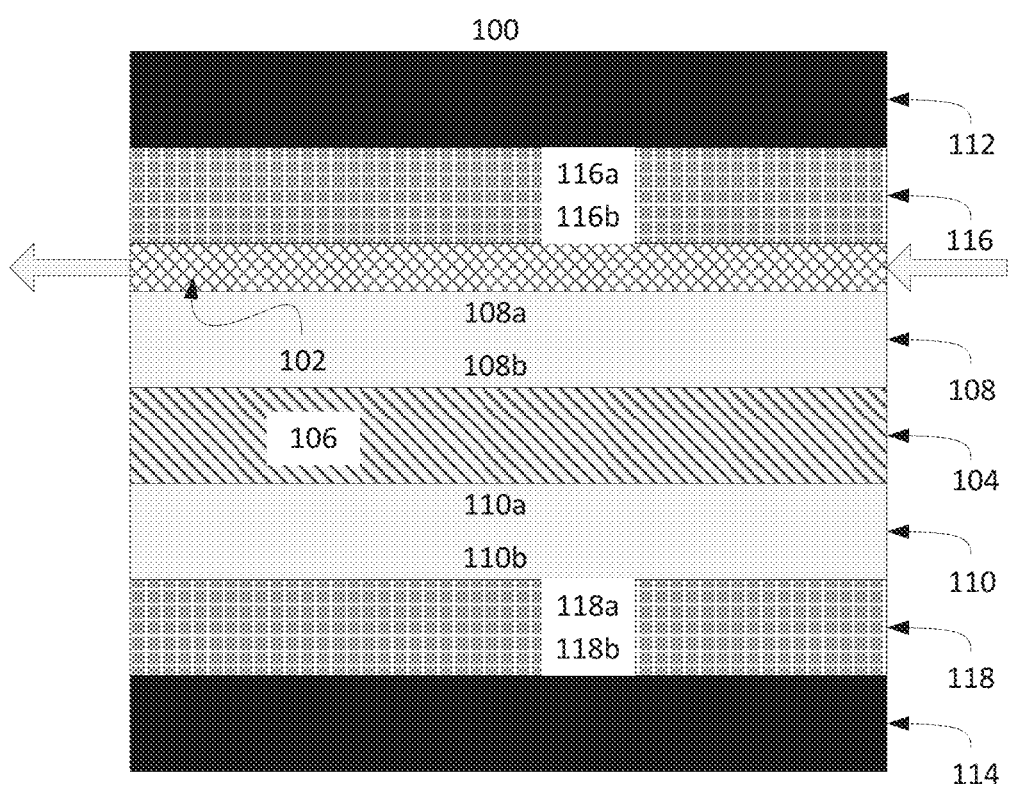

Referring now to FIG. 1B, in other non-limiting embodiments, the gas separation apparatus of the invention further comprises at least one of a first corrosion resistant layer 116 and a second corrosion resistant layer 118. The first and second corrosion resistant layers 116,118 are electrically conducting layers. In certain embodiments, the first corrosion resistant layer 116 comprises a first surface 116a and a second surface 116b wherein the first surface 116a and the second surface 116b are opposite to each other and the second corrosion resistant layer 118 comprises a first surface 118a and a second surface 118b, wherein the first surface 118a and the second surface 118b are opposite to each other. The first corrosion resistant layer 116 can be situated between the first current collector 112 and the gas permeable layer 102, such that the first surface 116a is in contact with the first current collector 112 and the second surface 116b is in contact with the gas permeable layer 102. The second corrosion resistant layer 118 can be situated between the second electrode 110 and the second current collector 114, such that the first surface 118a is in contact with the second surface 110b of the second electrode 110 and the second surface 118b is in contact with the second current collector 114. Without being limited to any specific purpose, the corrosion resistant layers can serve to protect and prevent corrosion of one or more layers selected from the first and second current collectors 112, 114, the first and second electrodes 108, 110 and the gas permeable layer 102. In certain embodiments, the first current collector 112 is in physical contact and spans the first surface 116a of the first corrosion resistant layer 116, and the second current collector 114 is in physical contact and spans the second surface 118b of the second corrosion resistant layer 118.

Figure 1C:
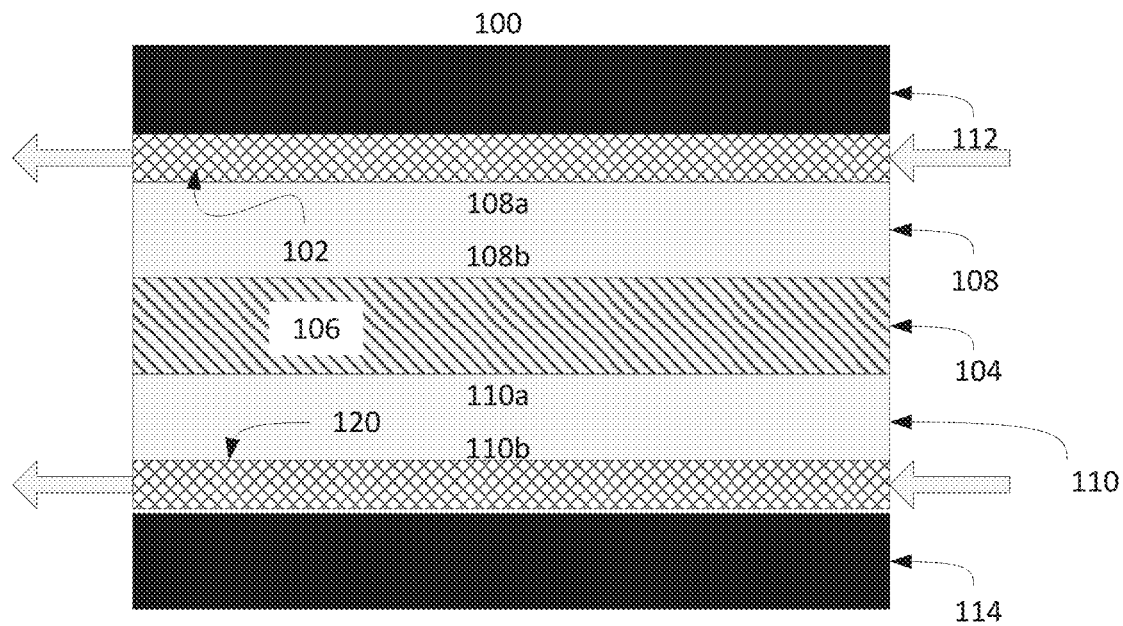
Figure 1D:
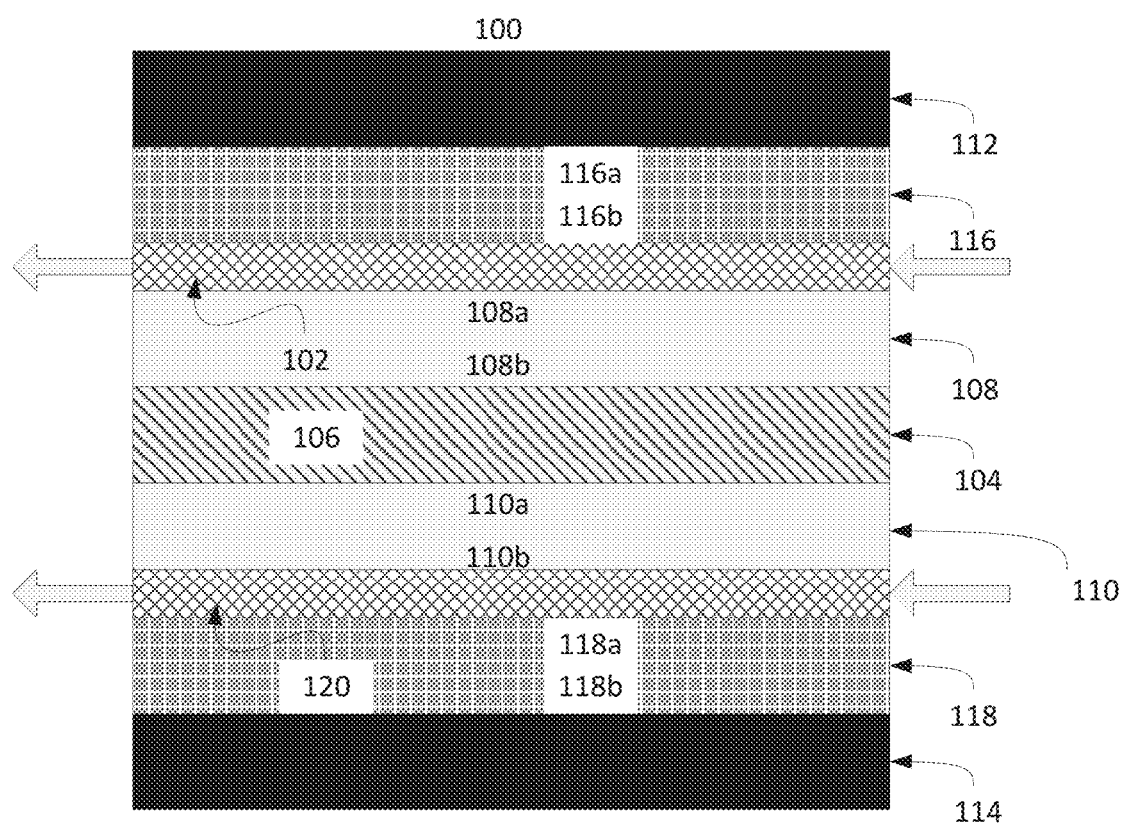

Referring now to FIGS. 1C and 1D, in other non-limiting embodiments, the gas separation apparatus of the invention can comprise elements as described above, further comprising a second gas permeable layer 120 disposed between the second surface 110b of the second electrode 110 and: the second electrode 114 (FIG. 1C); or the first surface 118a of the second corrosion resistant layer 118.

Figure 2A:
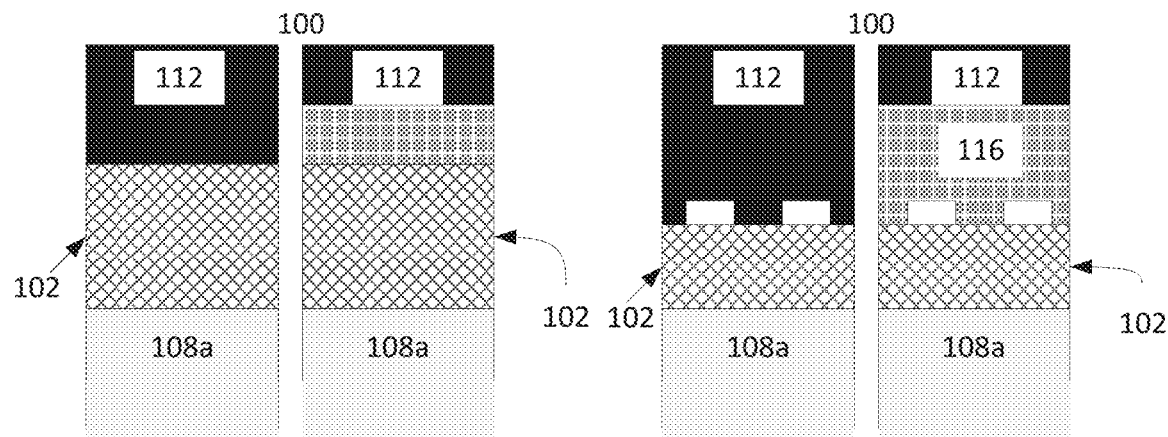
FIGS. 2A-2C are diagrams depicting various exemplary embodiments of the apparatuses of the invention, focusing on the various embodiments of the gas permeable layer.
Figure 2B:
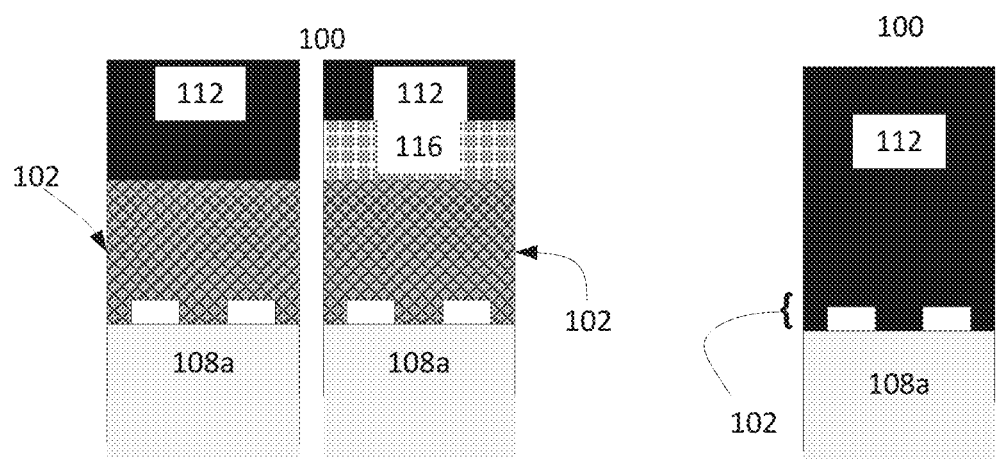
Figure 2C:
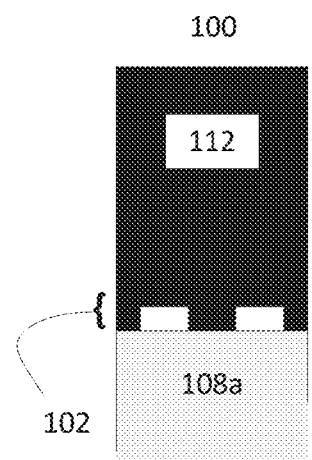

In certain embodiments, the gas permeable layer 102 is a material that allows for the passage of gases and allows gases to come in contact with the first surface 108a of the first electrode 108. Referring now to FIG. 2A, in certain embodiments, the gas permeable layer 102 is a porous electrically conducting material which is permeable to a gas. In certain embodiments, the gas permeable layer 102 comprises one or more materials selected from the group consisting of carbon cloth, carbon mesh, carbon felt, carbon paper, metallic foam, metallic mesh, and metallic paper. In certain embodiments lacking a first corrosion resistant layer 116, the first current collector 112 can comprise one or more fluidic channels that allow for gaseous flow over the gas permeable layer 116, as depicted in FIG. 2A, 3rd diagram. In certain embodiments further comprising a first corrosion resistant layer 116, the second surface 116b of the first corrosion resistant layer 116 can comprise one or more fluidic channels that allow for gaseous flow over the gas permeable layer 102, as depicted in FIG. 2A, 4th diagram. Referring now to FIG. 2B, in an alternate embodiment, the gas permeable layer 102 can be a solid, electrically conducting material comprising one or more fluidic channels that allow for gaseous flow between the gas permeable layer 102 and the first surface 108a of the first electrode 108, such that the gas contacts the first surface 108a of the first electrode 108. In such embodiments comprising fluidic channels, the gas permeable layer 102 can comprise one or more materials selected from the group consisting of carbon (such as but not limited to graphite), titanium, gold, silver, platinum, electrically conducting polymers, and stainless steel. In other embodiments, the gas permeable layer 102 can further comprise corrosion resistant ceramics and plastics which have been coated in one or more electrically conducting materials, such as but not limited to materials disclosed elsewhere herein. Referring now to FIG. 2C, in yet another embodiment, the gas permeable layer 102 can be a structure defining a set of one or more fluidic channels on the surface, e.g., otherwise flat surface, of the first current collector 112 such that a portion of the unitary body of the current collector itself defines one or more fluidic channels to allow for gaseous flow between the first current collector 112 and the first surface 108a of the first electrode 108, such that the gas contacts the first surface 108a of the first electrode 108. In certain embodiments wherein the gas permeable layer 102 is a structure defining a set of one or more fluidic channels, the gas permeable layer comprises one or more materials selected from the group consisting of carbon (such as but not limited to graphite), aluminum, titanium, gold, silver, platinum, electrically conducting polymers, and stainless steel. FIGS. 2A-2C can also analogously describe embodiments comprising a second gas permeable layer 120 as it relates to the second surface 110b of the second electrode 110, the second corrosion resistant layer 116 and the second current collector 114.

In certain embodiments, the gas separation apparatus 100 further comprises one or more gas inlets/outlets which allow for the passage of gases through the gas permeable layer 102. In embodiments comprising a second gas permeable layer 120, the gas separation apparatus 100 can further comprise one or more additional gas inlets/outlets which allow for the passage of gases through the gas permeable layer 120.

In certain embodiments, the first electrode 108 and the second electrode 110 comprise an electrically conducting material. In other embodiments, the first electrode 108 and the second electrode 110 independently comprise a material capable of reversibly adsorbing one or more gases upon the application of an electrical voltage. In yet other embodiments, the first electrode 108 and the second electrode 110 independently comprise at least one selected from the group consisting of high surface area carbon, e.g. BPL carbon, YP-50F, YP-80F, and Norit DLC-SE30; porous metals e.g. porous forms of titanium; electrically conducting porous metal-organic frameworks, and electrically conducting porous polymers, e.g. TP-COF. In certain embodiments, the first electrode 108 and the second electrode 110 do not contain any materials which are capable of catalytically oxidizing or reducing a gas species. In other embodiments, the apparatus is adapted and configured such that the first electrode 108 and the second electrode 110 comprise materials specifically selected such that they do not react (cause a redox reaction) with gaseous compounds of interest.

In certain embodiments, the first current collector 112 and the second current collector 114 independently comprise a metal layer, plate and/or sheet. In other embodiments, the first current collector 112 and the second current collector 114 can be made of a material selected from the group consisting of electrically conducting metals, such as but not limited to titanium and aluminum, carbon, electrically conducting polymers, and electrically conducting ceramics. In other embodiments, the first current collector 112 and the second current collector 114 can be made of a material selected from carbon, titanium, steel, gold, silver, platinum, palladium, aluminum, copper, lead, tin, and electrically conducting polymers, such as but not limited to polyacetylene and polyaniline. In yet other embodiments, the first current collector 112 and the second current collector 114 can be made of a material which is resistant to corrosion and/or are chemically inert to one or more gases which can be flowed through the gas permeable layer(s) 102, 120 and are further chemically inert to the electrolyte 106.

In certain embodiments, the first corrosion resistant layer 116 and second corrosion resistant layer 118 can comprise any electrically conducting material which is resistant to corrosion and/or are chemically inert to one or more gases which can be flowed through the gas permeable layer(s) 102, 120 and are further chemically inert to the electrolyte 106. In certain non-limiting embodiments, the first corrosion resistant layer 116 and second corrosion resistant layer 118 independently comprise one or more materials selected from the group consisting of carbon (such as but not limited to graphite), titanium, gold, silver, platinum, electrically conducting polymers, and stainless steel. In other embodiments, the first corrosion resistant layer 116 and second corrosion resistant layer 118 can further comprise corrosion resistant ceramics and plastics which have been coated in one or more electrically conducting materials, such as but not limited to materials disclosed elsewhere herein.

In certain embodiments, the separator 104 is an electrically insulating material comprising pores which allow for the flow of an electrolyte 106. In other embodiments, the separator 104 comprises macropores, micropores or nanopores. The separator 104 can be made of any electrically insulating separator material known in the art, such as, but not limited to those used in coin-type super capacitors. In certain embodiments, the separator 104 comprises at least one material selected from the group consisting of porous cellulose, porous polypropylene and porous polyethylene. The electrolyte 106 can be any electrolyte known in the art, such as those used in coin-type super capacitors and fuel cells. In certain embodiments, the electrolyte 106 can comprise at least one selected from the group consisting of an aqueous or non-aqueous salt solution, such as but not limited to an aqueous solution of NaCl and/or an acetonitrile solution of $NEt_4^+ BF_4^-$. In certain embodiments, the electrolyte comprises at least one selected from the group consisting of an aqueous salt solution [such as, but not limited to, NaCl, LiCl, KCl, $Na_2SO_4$, $Li_2SO_4$, $K_2SO_4$, NaF, LiF, KF, $H_2SO_4$, $H_3PO_4$, HCl, NaOH, KOH, LiOH, $LiClO_4$, $NaClO_4$, $KClO_4$, $NaPF_6$, $LiPF_6$, $NaPF_6$, $KPF_6$, $LiBF_4$, $NaBF_4$, $KBF_4$, tetraalkyl ammonium tetrafluoroborates, chlorides, fluorides, sulfates, perchlorates, and hexafluorphosphates, tetraphosphonium tetrafluoroborates, chlorides, fluorides, sulfates, perchlorates, and hexafluorophosphates], ionic liquid [such as, but not limited to, 1-ethyl-3-methylimidazolium acetate, 1-ethyl-3-methylimidazolium tris(pentafluoroethyl)trifluorophosphate, 1-butyl-3-methylimidazolium bis(perfluoroethylsulfonyl)imide, 1-butyl-3-methylimidazolium bis(fluorosulfonyl)imide, 1-hexyl-3-methylimidazolium bis(trifluoromethylsulfonyl)imide, 1-octyl-3-methylimidazolium bis(trifluoromethylsulfonyl)imide], and organic solvent-contained (and/or organic solvent-only) salt solution [such as, but not limited to, a salt such as, but not limited to, NaCl, LiCl, KCl, $Na_2SO_4$, $Li_2SO_4$, $K_2SO_4$, NaF, LiF, KF, $H_2SO_4$, $H_3PO_4$, HCl, NaOH, KOH, LiOH, $LiClO_4$, $NaClO_4$, $KClO_4$, $NaPF_6$, $LiPF_6$, $NaPF_6$, $KPF_6$, $LiBF_4$, $NaBF_4$, $KBF_4$, tetraalkyl ammonium tetrafluoroborates, chlorides, fluorides, sulfates, perchlorates, and hexafluorphosphates, tetraphosphonium tetrafluoroborates, chlorides, fluorides, sulfates, perchlorates, and hexafluorophosphates, in an organic solvent, such as but not limited to acetonitrile, gamma-butyrolactone, propylene carbonate, tetrahydrofuran, and diethylcarbonate]. In certain embodiments, the separator 104 and the electrodes 108, 110 are in close contact, allowing for capillary forces to draw the electrolyte 106 into the electrodes 108, 110. This results in an electric double layer upon electrode charging. In other embodiments, formation of the double layer leads to supercapacitance.

In certain embodiments, the first and second electrodes 108, 110 are electrically connected with a variable voltage source. In other embodiments, the first and second current collectors 112, 114 are electrically connected with a variable voltage source. In certain embodiments, the first electrode 108 is a cathode and the second electrode 110 is an anode. In other embodiments, the first current collector 112 is a cathodic current collector and the second current collector 114 is an anodic current collector.

In certain embodiments, the apparatus further comprises one or more electrically insulating gaskets 122. In certain embodiments, the gaskets can form a seal around at least one of the gas permeable layer 102, separator 104 comprising an electrolyte 106, first electrode 108, second electrode 110, first corrosion resistant layer 112 and second corrosion resistant layer 114 and optionally the second gas permeable layer 120, if present. In certain embodiments, the gasket 122 forms a seal against liquid and gas exchange around one or more layers. In certain embodiments, the gasket 122 serves to form an enclosed system, externally bounded by the first current collector 112, the gasket 122 and the second current collector 114. In other embodiments, the system formed by the gasket and the one or more additional layers mentioned are sealed against liquid and gas exchange except for gases passing through at least one gas inlets and/or at least on gas outlet in fluidic communication with the gas permeable layer(s) 102, 120.

Figure 3:
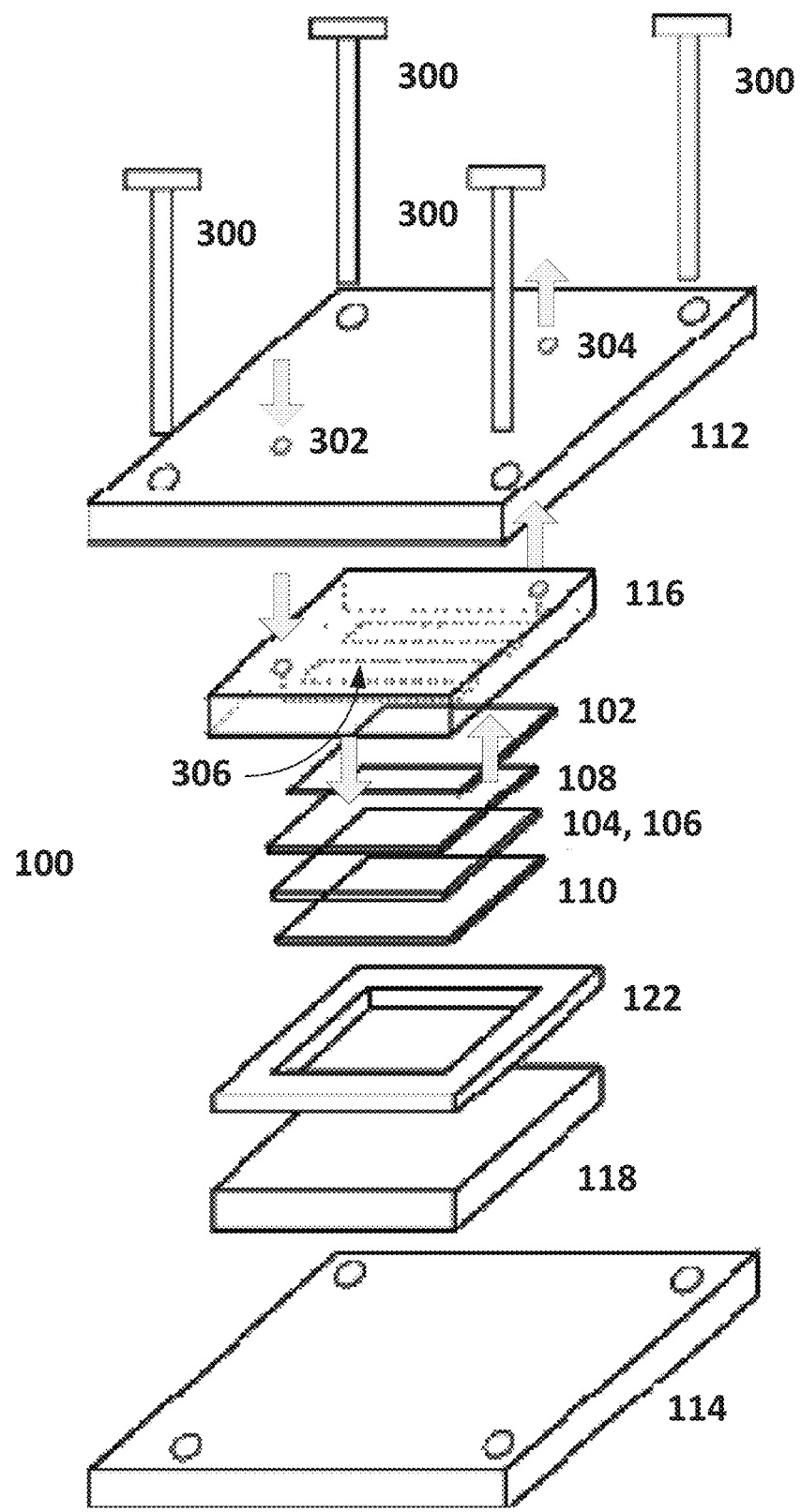
FIG. 3 illustrates an exemplary supercapacitive swing adsorption apparatus (illustrated in exploded view).

In a non-limiting example, the apparatuses are constructed according to FIG. 3. In this non-limiting example, two carbon electrodes 108, 110 containing a high surface area carbon, e.g. BPL carbon or other electrically conducting porous materials with a preferable thickness between 0.1-1.0 mm, are prepared. The two electrodes 108, 110 are separated by an electrically insulating porous plate/sheet (separator) 104, which may be made from polypropylene or cellulose. The thickness of the separating plate/sheet falls within the range of, in a non-limiting example, 0.1-0.5 mm. Such thicknesses provide fast ion transport. The carbon electrode 108 and the separator 104 are infiltrated with the electrolyte 106, which may be aqueous or non-aqueous solutions of ionic compounds, e.g. aqueous NaCl solutions with a concentration of 1M. A dense lower carbon plate/sheet 118 is placed on a metal (e.g. aluminum) plate/sheet 114. A gasket 122 (e.g. made of EPDM rubber) is placed on the carbon plate/sheet. The electrodes 108, 110 as well as the separator 104, are fitted into the gasket (the height of the gasket is the sum of the thicknesses of the electrodes 108, 110 and the separator 104). A gas permeable layer 102 is positioned between the electrode 108, and an upper graphite plate/sheet 116. The upper carbon plate/sheet 116 is then placed on top of the gasket. A second aluminum plate/sheet 112 is placed on top of the carbon plate/sheet 116. In this exemplary embodiment, the upper carbon plate/sheet 116 and the upper aluminum plate/sheet 112 comprise an inlet 302 and outlet 304 for gas flow into and out of the apparatus 100, in such a way that the gas can flow through the gas permeable layer and into contact with the electrode 108. The assembly is then bound together in abutting relationship, e.g., by a plurality of fasteners 300 (such as, for example, 4 bolts as depicted in FIG. 3) that connect the top and the bottom aluminum plate/sheets 112, 114. In certain embodiments, the bolts have plastic sleeves and/or the screws are made of plastic, ensuring that the two Al plates/sheets stay electrically insulated from each other. The aluminum plates/sheets 112, 114 serve as current collectors and the carbon plates/sheets 116, 118 ensure that there is no corrosion when the bias is applied. The gasket 120 makes the assembly leak-tight. The close contact ensures that the electrolyte 106 can be drawn from the separator 104, which is be soaked with electrolyte 106, into the gas-exposed carbon electrode by capillary forces. Serpentine gas channels 306 are machined into the carbon plate/sheet 116 to allow for gas flow, however other channel shapes may also be used. When the screws 300 are tightened, the components inside of the apparatuses get pressed together and seal the entire assembly. The apparatus is corrosion-resistant because liquid and gaseous components come in contact only with carbon/corrosion resistant materials.

Figure 4:
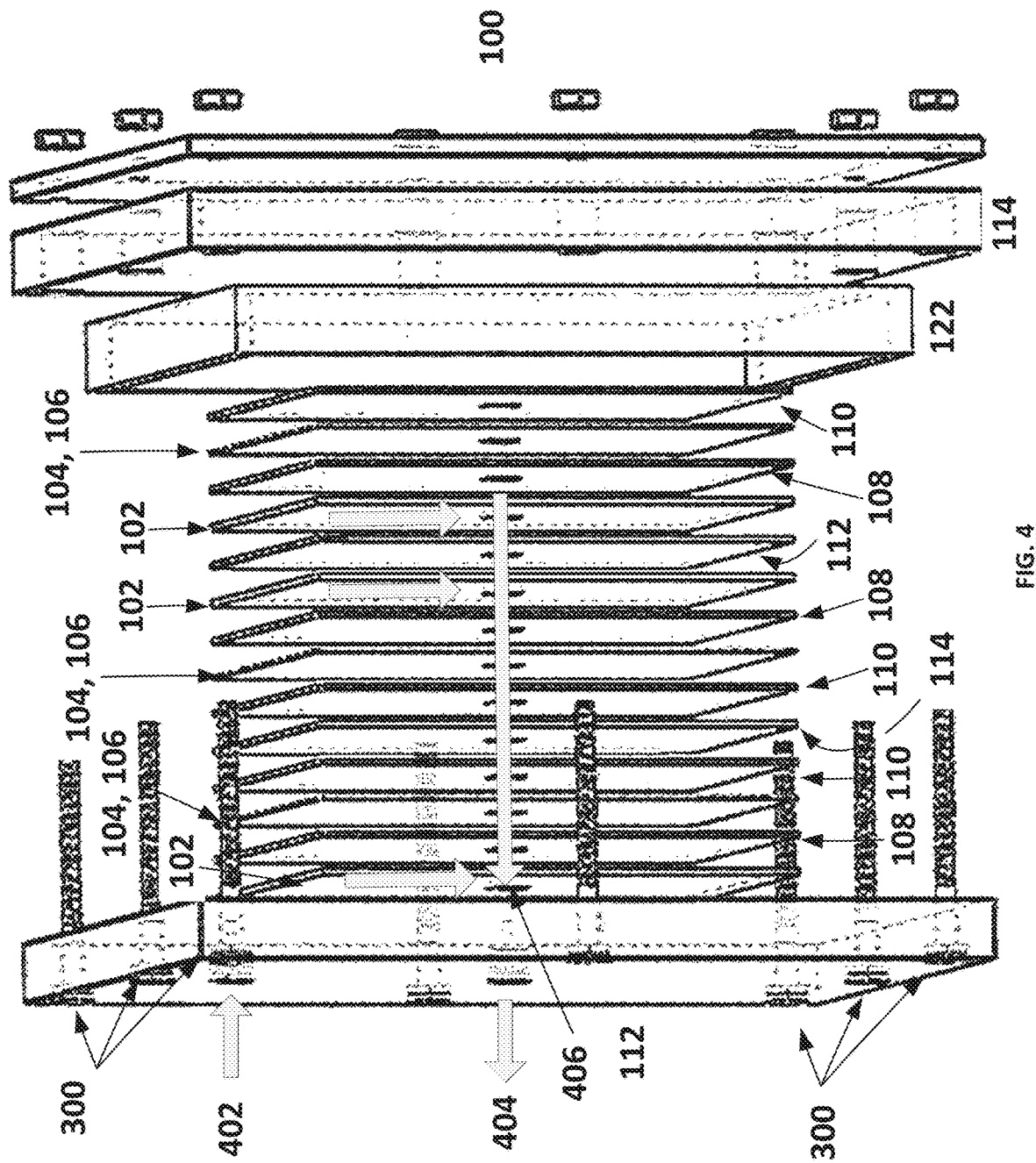
FIG. 4 illustrates an exemplary radial diffusion supercapacitive swing adsorption apparatus (illustrated in exploded view).

In another non-limiting example, the apparatuses are constructed according to FIG. 4. The apparatus is assembled as a "radial flow" device, comprising one or more stacks of the assembly described in FIG. 1A, and as exemplified in FIG. 7B. In this non-limiting example, the apparatus comprises a gas flow inlet 402 and a gas flow outlet 404 through the first current collector 112. The gas flow inlet 402 is adapted and configured to allow for gas flow into the apparatus in such a way that inflowing gas contacts the one or more gas permeable layers 102 which are in contact with a first surface 108a of a first electrode 108, allowing the gas to contact the one or more first electrodes 108. The gas can then flow through the one or more gas permeable layers 102 and into a central gas flow channel 406 and out of the gas flow outlet 404. The general design principles of a radial flow device as described herein are further illustrated in U.S. Pat. No. 8,968,546, wherein the design is applied to a capacitive deionization cell.

Figure 5:
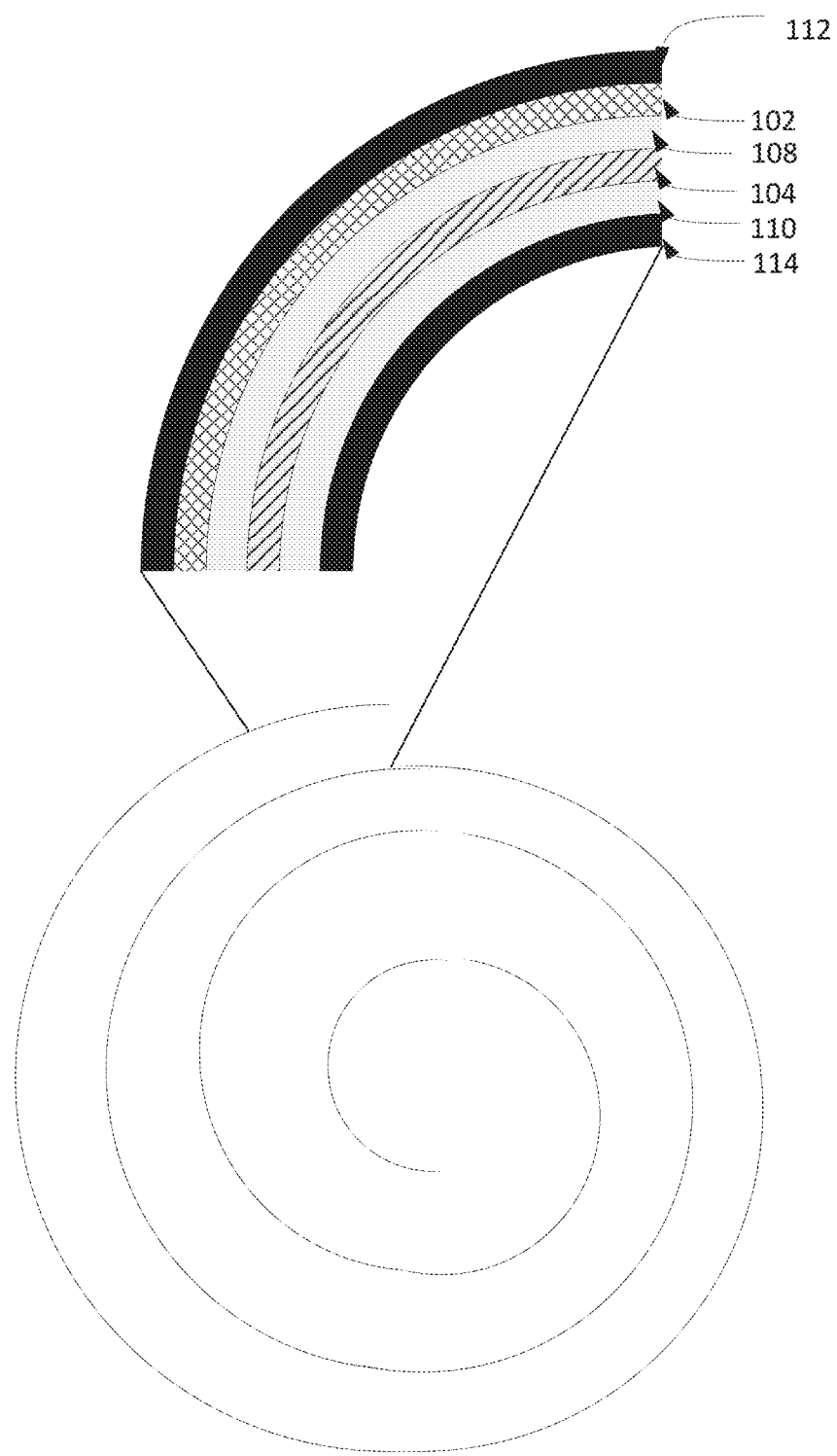
FIG. 5 illustrates an exemplary spiral wound supercapacitive swing adsorption apparatus cross section. The top panel depicts a detailed view of the various layers of the apparatus of the invention. The bottom panel depicts the general spiral wound configuration of the apparatus as a whole.

In additional non-limiting examples, the apparatuses of the invention can be constructed in a spiral-wound conformation, analogous to spiral wound supercapacitor devices known in the art, such as those described in U.S. Pat. No. 8,665,581 and U.S. Pat. No. 8,749,952, according to FIG. 5. In a non-limiting example, a gas permeable layer 102 is disposed between a first current collector 112 and a first electrode 108 and a second electrode 110 is deposited on a current collector 114. A separator 104 layer containing an electrolyte 106 is placed between the first electrode 108 and the second electrode 110 and the whole assembly is coiled into a tight spiral. The first and second current collectors 112, 114 can then connected to a variable voltage source and the assembly can be housed within a cylindrical housing comprising a gas inlet and a gas outlet. In certain embodiments, the gas inlet and gas outlet are disposed on opposite ends of the cylindrical housing. A gas can then be flowed through the apparatus from the gas inlet, through the coiled gas permeable layer 102 and out of the gas outlet.

In a further non-limiting example, the apparatuses of the invention can be constructed according to any other general conformations which would be apparent to a person of ordinary skill in the art, such as but not limited to, conformations analogous to pouch-type supercapacitors.

In certain embodiments, the layered shape of the electrodes provides good adsorption-desorption kinetics and charge-discharge kinetics. In other embodiments, the first and second electrodes have a thickness comparable with commercial supercapacitor electrodes (0.1-0.5 mm). Such electrodes can be charged and discharged at energy efficiencies of ca. 95% within seconds.

The apparatus of the invention is easily scalable. The apparatuses can be scaled by increasing the dimensions of the electrodes, separator plate/sheet, and current collector to dimensions exceeding 10 m. In addition to that, the apparatus can be scaled by stacking multiple apparatuses similarly to the stacking of fuel cells and capacitive deionization modules.

Methods

The present invention further provides methods of using the devices disclosed herein for the separation of one or more gases from a gaseous mixture. In certain embodiments, the methods separate a first gas at least partially from at least one other gas. In one embodiment, the invention involves a method of adsorbing gases and separating components of a gas stream.

The present invention operates on the principle that the first electrode has a first affinity for one or more gases which are flowed through the gas permeable layer in an uncharged state and a second affinity for the one or more gases in a charged state. When the first electrode has a greater affinity for the one or more gases, the first electrode will adsorb the gas and when the first electrode has a lower affinity for the one or more gases, the first electrode will desorb the gas. This property can be taken advantage of to selectively remove the one or more gases, at least partially, from a gaseous mixture. In certain embodiments, the first affinity in the uncharged state is greater than the second affinity in the charged state. In other embodiments, the first affinity in the uncharged state is lower than the second affinity in the charged state.

In an example, a method is provided for reversibly adsorbing and desorbing a gas, the method comprising the steps of: a) providing an apparatus of the invention (described elsewhere herein) having pores in at least one exposed surface of the first electrode, the electrode further comprising an electrolyte in contact with the electrode; and b) contacting the first electrode with a gas, the gas comprising an adsorbate gas; and c) reversibly providing an electric charge to the apparatus to cause an electric double layer to form, thereby altering an initial adsorption property of the first electrode relative to the adsorbate.

In certain embodiments, the method comprises flowing the gaseous mixture through an apparatus in accordance with the present invention, wherein a varying voltage is applied to the first and second electrodes. In other embodiments, the first gas and the at least one other gas have different adsorptivities in the apparatus when the voltage is applied to the first and second electrodes. In yet other embodiments, the electrodes are charged capacitively while voltage is applied. In yet other embodiments, applying voltage to the first and second electrodes does not produce any electrochemical redox process in the gases of the gaseous mixture.

In one example, the method comprises the steps of:

1) introducing a gaseous mixture to the apparatus, such that the gaseous mixture flows through the gas permeable layer;

2) applying a charge to the first and second electrode, wherein the first electrode selectively adsorbs at least one gas from the gaseous mixture;

3) flushing the gaseous mixture from the apparatus;

4) removing the applied charge from the first and second electrode, wherein the first electrode desorbs the adsorbed gas; and 5) venting the desorbed gas from the apparatus.

It can be anticipated from the design principles of the apparatus that any gas mixture may be separated, the only requirement being that the applied voltage does not alter the adsorptivity of the gases in the gas mixture in an identical way. Such gas mixtures may be for example $CO_2/CH_4$, $CH_4/N_2$, $CO_2/H_2$, $N_2/O_2$, alkanes/olefins and so forth. In other embodiments, the gases in the gaseous mixture can be selected from the group consisting of $CO_2$, $N_2$, $O_2$, $SO_2$, $SO_3$, $SO_4^{2-}$, $H_2S$, NO, $NO_2$, $NO_3$, $H_2$, $CH_4$, CO, $NH_3$, $PH_3$, $AsH_3$, $NF_3$, $PF_3$ He, Ne, Ar, Kr, Xe, boranes, silanes, and hydrocarbon, fluorocarbon, chlorocarbon, and iodocarbon-gases.

In certain embodiments, the devices, methods and systems of the invention are of particular interest because they are capable of operating at high efficiency. In one aspect, the SSA apparatuses of the invention minimize energy loss due to electrolyte resistance. By using a thin separator layer soaked with an electrolyte instead of a bulk electrolyte solution, energy loss due to resistance is largely negated. In another aspect, the SSA apparatuses of the invention do not require the use of any moving parts. The apparatuses operate through the application and removal of an applied voltage and the use of flowing gas streams and no moving parts are needed, minimizing energy cost. In yet another aspect, the SSA apparatuses of the invention operate quickly due to the use of a gas permeable layer, whereby the gas does not need to be dissolved in a liquid before being fed into the system. By using a gas flow, the at least one gas which is to be adsorbed can move quickly through the gas permeable layer and come in contact with the adsorbing electrode. Similarly, the gas can be desorbed and vented or flushed more easily by not needing to re-dissolve in an electrolyte solution in order to exit the apparatus. Further, by using gas flow instead of an electrolyte solution, the desorbed gas does not need to be removed or separated from the electrolyte solution. In yet another aspect, the SSA apparatuses of the invention can be packed very space efficiently, especially in layered, radial and spiral-wound configurations as described herein. In yet another aspect, the SSA apparatuses of the invention are highly scalable by means which could be envisioned by those skilled in the art. Supercapacitor systems have been shown to be highly scalable and applicable to large scale industrial processes. Modifications which would be applicable in the field of large scale supercapacitors, capacitive deionization systems and large scale fuel cell technologies could be applied to the present invention.

DEFINITIONS

Unless defined otherwise, all technical and scientific terms used herein generally have the same meaning as commonly understood by one of ordinary skill in the art to which this invention belongs. Generally, the nomenclature used herein and the laboratory procedures in chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "BPL carbon" refers to a virgin granular activated carbon with a high surface area and micro- and mesoporosity. It is a bituminous coal-based product activated using high temperature in a controlled atmosphere. It is electrically conducting and chemically stable in aqueous and non-aqueous electrolytes.

As used herein, the term "TP-COF" is a highly ordered organic framework consisting of pyrene and triphenylene functionalities alternatively linked in a mesoporous hexagonal skeleton.

As used herein, two or more components in "fluidic" communication can exchange gases and/or liquids among them.

When not otherwise stated, the term "substantially" means being largely, but not wholly, that which is specified.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Unless otherwise indicated, all numbers expressing quantities of materials, properties, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. For example, it should be understood that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Figure 6A:
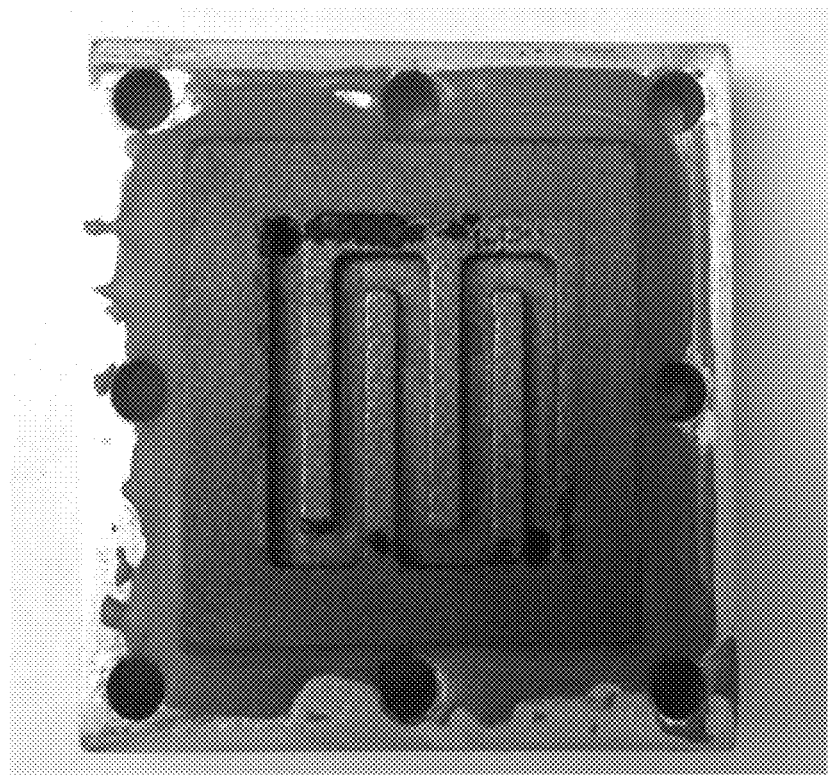
FIG. 6A is a picture of an exemplary aluminum current collector and graphite plate comprising a series of serpentine gas flow channels. As depicted in this exemplary embodiment, the graphite plate comprising the gas flow channels serves as a gas permeable layer.

Example 1: Construction and Operation of a Supercapacitive Swing Adsorption Module Materials and Methods Electrode fabrication: The electrodes were fabricated using the following procedure: 0.083 g 60% Polytetrafluoroethylene (PTFE) dispersion (Sigma-Aldrich) was dispersed in 10 mL ethanol and stirred. PTFE/gluten mixtures were used as the binder. After the PTFE was completely dissolved, 0.8 g BPL carbon, 0.1 g gluten (Hodgson Mill, food grade), and 0.05 g conductive carbon black (Cabot Corporation) was added to the solution. PTFE was chosen because of its excellent film-forming abilities. The gluten served as a co-binder which ensured the sufficient hydrophilicity of the binder mixture. Carbon black was added to increase the conductivity of the electrodes. The final ratio of BPL:Carbon black:Gluten:PTFE was 80:5:10:5 by mass. The solution was then stirred at 60° C. in a vial for 2 hours. Afterwards, the ethanol was evaporated at 80° C. until the mixture became a slurry. The slurry was then transferred to a flat glass panel and mixed thoroughly with a metal spatula for 1 hour until the slurry became a sticky dough-like substance. Then, the dough was rolled against a glass slide using a glass vial having a diameter of 2.54 cm to form a sheet with uniform thickness. Subsequently, two 1.4 cm×1.4 cm sheets were cut out and used as electrodes. The mass of the electrodes was adjusted by modifying the thickness of the sheet. The electrodes were dried at 100° C. for 12 hours in a vacuum oven to remove any solvent residue (the pressure in the oven was ~25 mmHg). Assembly of the Module: Two square aluminum plates with 3 cm×3 cm size served as mechanical support and current collector for the device. The thickness for the top and bottom aluminum plates were ½ inch and ¼ inch, respectively. Two holes (1 mm diameter), which served as gas inlet and outlet ports, were drilled into the top aluminum plate. These holes were connected to ⅛" diameter stainless steel tubing via Swagelok connectors. In addition, each aluminum plate had eight additional holes near the edges which would fit eight set screws that would hold the entire module together. Both aluminum plates had a 2 cm×2 cm×1 mm recess area in the center. Two square (2×2 cm) graphite plates with a thickness of ¼ inch (grey) were fitted into the recess of the aluminum plates. The top graphite plate contained two holes (1 mm diameter) that aligned with the holes in the top aluminum plate. The top graphite plate had 1 mm wide and 1 mm deep serpentine gas flow channels, leading from the first hole in the graphite plate to the second hole in the graphite plate (FIG. 6A). Graphite was chosen as material because it does not corrode when in contact with aqueous electrolytes, and provides good electronic conductivity.

Figure 6B:
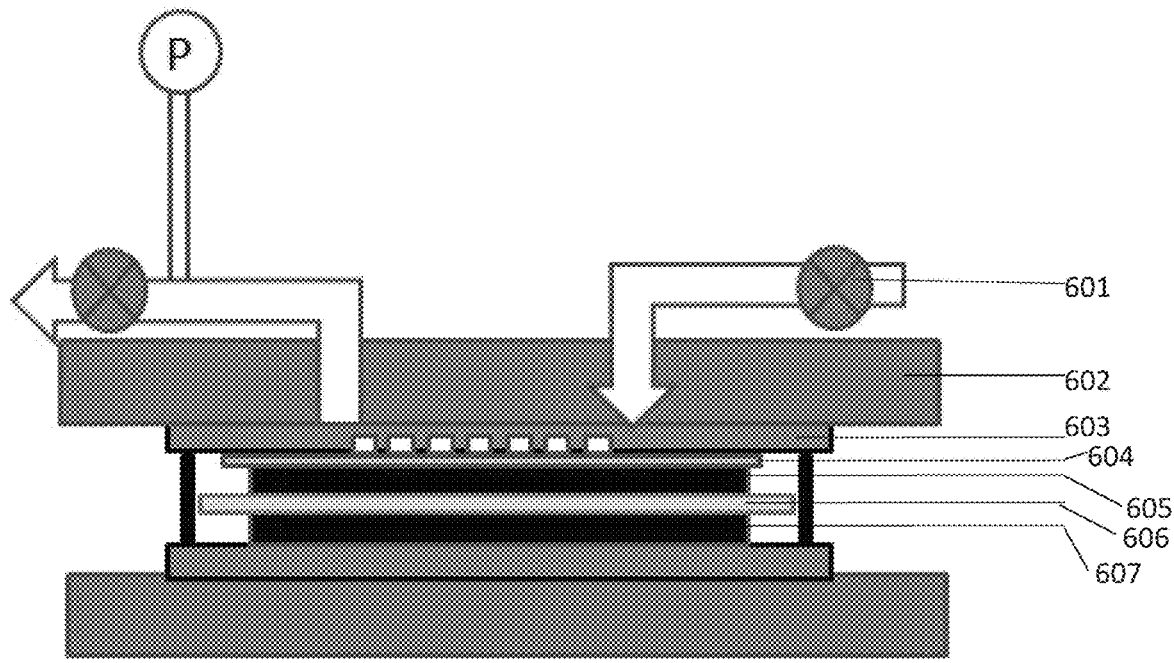
FIG. 6B is a diagram of an exemplary SSA gas separation module in a cross-sectional view. The module comprises: a valve 601, an aluminum block 602, a graphite plate with gas diffusion channels 603 (as depicted in FIG. 6A), a carbon cloth 604, a top electrode 605, a separator 606 and a bottom electrode 607.
Figure 6C:
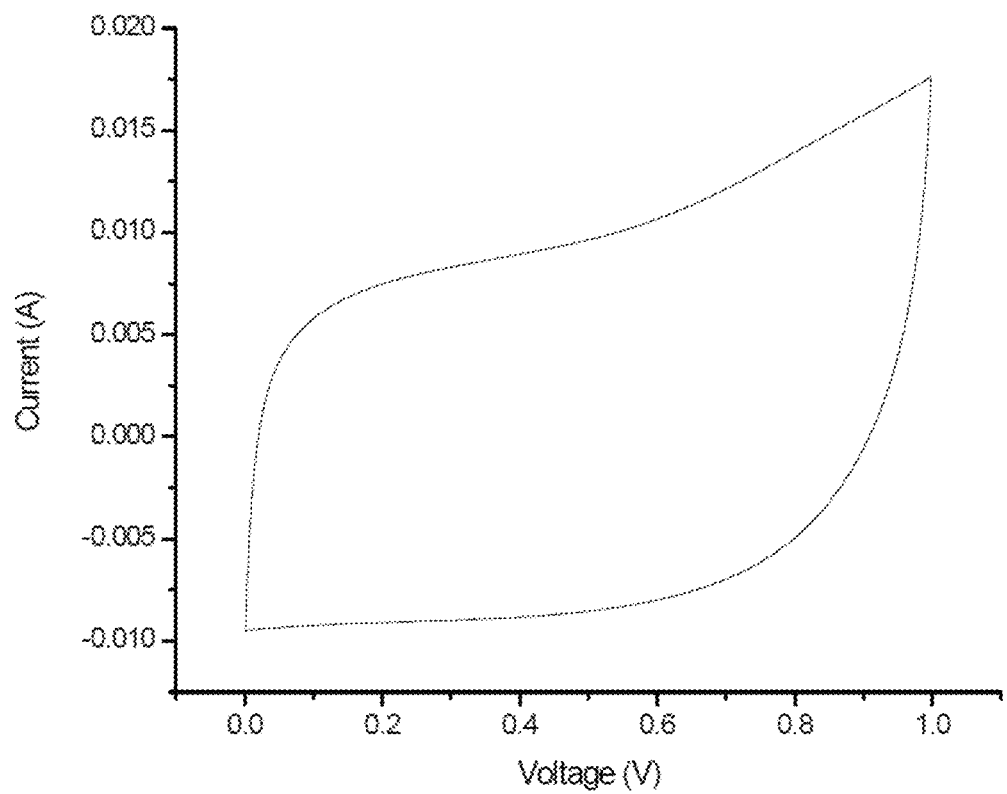
FIG. 6C is a CV curve of the exemplary SSA module depicted in FIG. 6B and reported in Example 1 (scanning rate: 1 mV/sec).
Figure 6D:
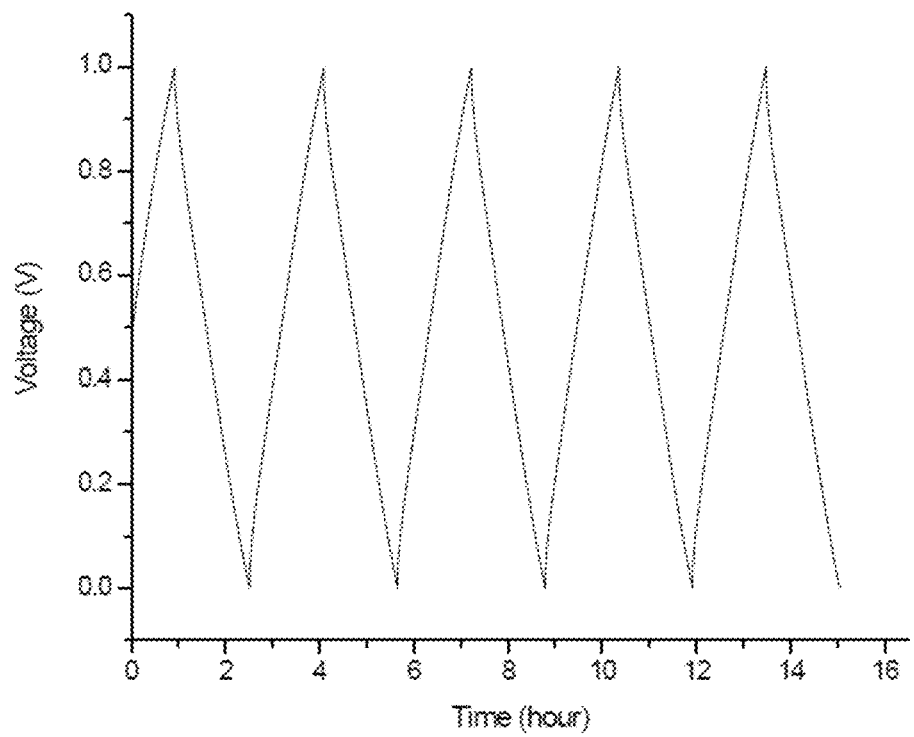
FIG. 6D is a graph reporting a galvanostatic charge-discharge experiment with the exemplary SSA module depicted in FIG. 6B and reported in Example 1 (current=1 mA).

One of the electrodes prepared as described above was soaked completely in 1 M NaCl for 2 hours, and used as the anode. The other electrode was wetted with electrolyte solution on only one side, so that the other side remained accessible for gas molecules. A separator membrane (1.6 cm×1.6 cm) was cut from a WHATMAN® Grade 2 filter paper (GE Healthcare Life Sciences) and placed in between the electrodes to prevent short-circuiting between them. The sandwich made of the two electrodes and the separating membrane was transferred onto the bottom graphite plate, so that the fully electrolyte-soaked bottom electrode was in contact with this graphite plate. A 2 cm×2 cm rubber seal (gasket) with an 1.7 cm×1.7 cm opening was cut from an EPDM rubber sheet (⅛ in, MCMASTER-CARR®) and placed on top of the electrode sandwich. A high-vacuum grease (APIEZON® M grease) was applied to the rubber seal to prevent leaking. Then a 1.4 cm×1.4 cm sized carbon cloth (AVCARB® 1071 HCB) was placed on the top electrode. The cloth acted as gas permeable layer that would provide gas access to the entire electrode area. The top aluminum plate and bottom aluminum plate was then clamped together by 8 electrically insulating set screws. These screws were tightened evenly to 15 Nm using a torque wrench. A complete materials sheet for the device is shown in Table 1 and the entire assembly is shown in FIG. 6B.

TABLE 1

Materials and Suppliers

| Component | Vendor | Size/Model No. |
|---|---|---|
| Pressure transducer | OMEGA® | MMA015C1T3C2TA5S |
| Dielectric connection | SWAGELOK® | SS-6-DE-6 |
| Stainless Steel Tube | SWAGELOK® | SS-T2-S-028-20, ⅛ in |
| Graphite plate | MCMASTER-CARR® | ¼ in |
| Aluminum plate | MCMASTER-CARR® | ½ in, ¼ in |
| Separator membrane | WHATMAN® | Filter paper grade 2 |
| Rubber sealer | MCMASTER-CARR® | High-Strength 60A EPDM rubber, ⅛ in |
| High vacuum grease | APIEZON® | |
| Carbon Cloth | AVCARB® | 1071 HCB, 20 cm * 20 cm |

Breakthrough Experiments

Exemplary apparatuses of the invention, with electrode dimensions of 1.4×1.4 cm and electrode masses of 0.29 g as described above, were tested for the separation of $CO_2$ from $N_2$. 1M NaCl solutions were used as electrolytes, BPL carbon (Calgon) was used as electrode materials. To be able to control the gas flow into the apparatus, a mass flow controller was placed in front of the gas inlet. A gas flow meter was connected to the gas outlet to measure the amount of gas leaving the device. After the assembly of the module, the two valves were opened and a 15%: 85% $CO_2$:$N_2$ gas mixture, moistened by bubbling the mixture through a 1 M NaCl solution, was flowed through the module for 2 h at a flow rate of 0.1 cc min$^{-1}$. The gas mixture served as a flue gas simulant. Then, the gas entry and exit valves were closed, and the device was left to sit overnight to let the $CO_2$ fully dissolve in the electrolyte, and the conventional $CO_2$ adsorption to the electrodes complete. After that, the device was purged quickly for 1 min in an $N_2$ stream at a flow rate of 10 cc min$^{-1}$. This last step had the purpose to remove all $CO_2$ from the dead volume without removing significant amounts of conventionally adsorbed and dissolved CO2 from the system. The combined steps are important in order to clearly distinguish between $CO_2$ separated by conventional adsorption, and $CO_2$ separated by the SSA effect.

Figure 6E:
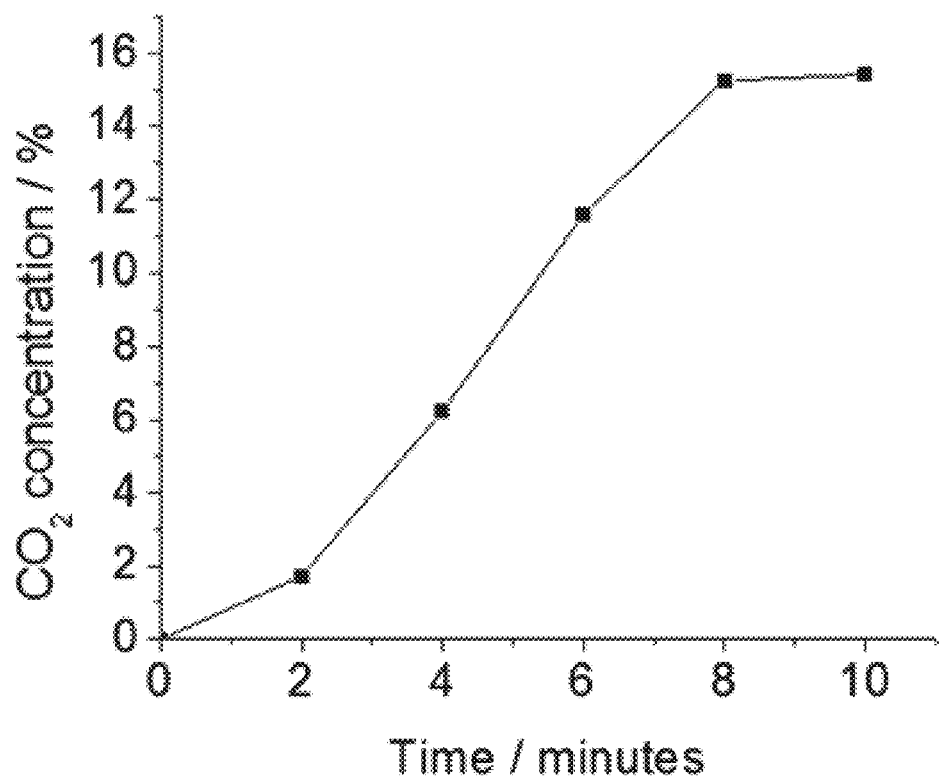
FIGS. 6E-6G are graphs of breakthrough curves obtained in SSA experiments using the exemplary SSA module depicted in FIG. 6B with a gas mixture of 15% $CO_2$/85% $N_2$, BPL carbon electrodes, a 1M NaCl electrolyte solution.

Next, a breakthrough curve without applied bias was measured by flowing a 15%: 85% $CO_2$:$N_2$ gas mixture through the device. As shown in FIG. 6E, the $CO_2$ content reached its original value of 15% after a time of 9 min in the experiment without applied bias. This is the expected time for a gas mixture flowing through a dead volume of 0.9 mL at a flow rate of 0.1 cc min$^{-1}$. In an analogous SSA experiment with applied bias (1 V), shown in FIG. 6F, carbon dioxide was not detected for 22 min, and the original $CO_2$ content of 15% was measured only after 32 min. Considering that it took the gas 9 min to flow through the void volume, it can be concluded that the actual breakthrough of $CO_2$ occurred between 13 and 23 minutes. The results show that there was $CO_2$ separation due to the SSA effect. In order to see if the $CO_2$ adsorption was reversible, the gas entry and the gas exit valves were closed and the capacitor was discharged. After 30 min, the valves were opened and the desorbed $CO_2$ was purged out of the capacitor using $N_2$. To avoid the desorption of conventionally adsorbed $CO_2$, a fast purge rate of 1 cc min$^{-1}$ was used, and the effluent gas was analyzed by gas chromatography. As can be seen from Table 2 (column 2), the carbon dioxide concentration in the cell was increased dramatically to 46.61% compared to the initial gas mixture (15%), showing that the adsorption was reversible, and actual gas separation took place. The purging of the $CO_2$ from the SSA module was essentially complete after 2 minutes.

Figure 6F:
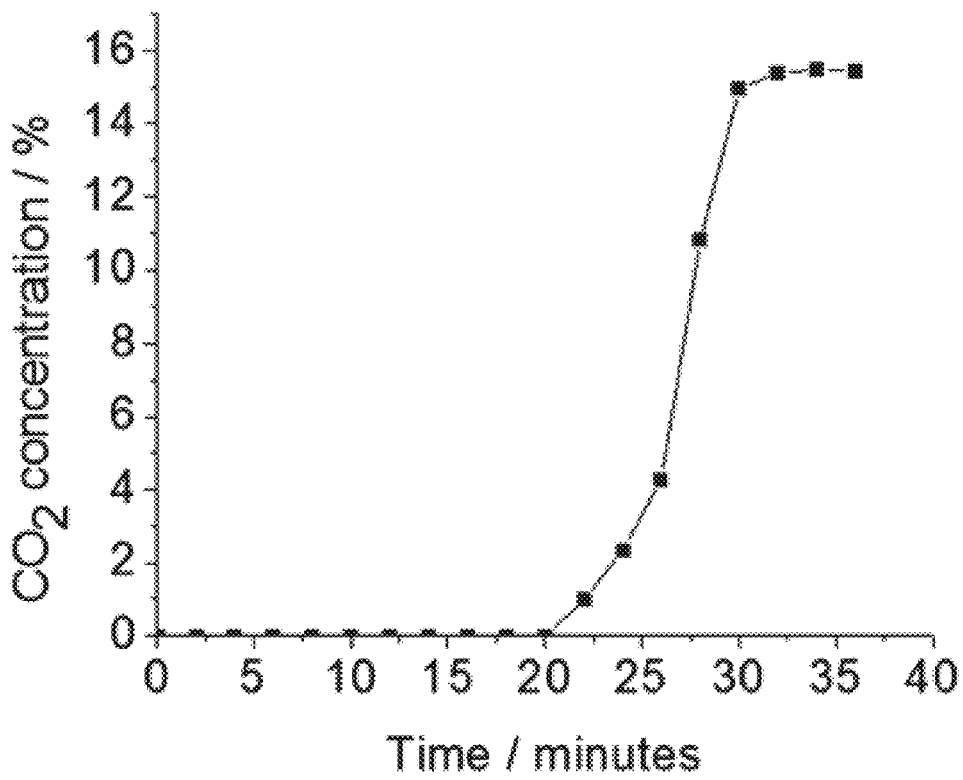
Figure 6G:
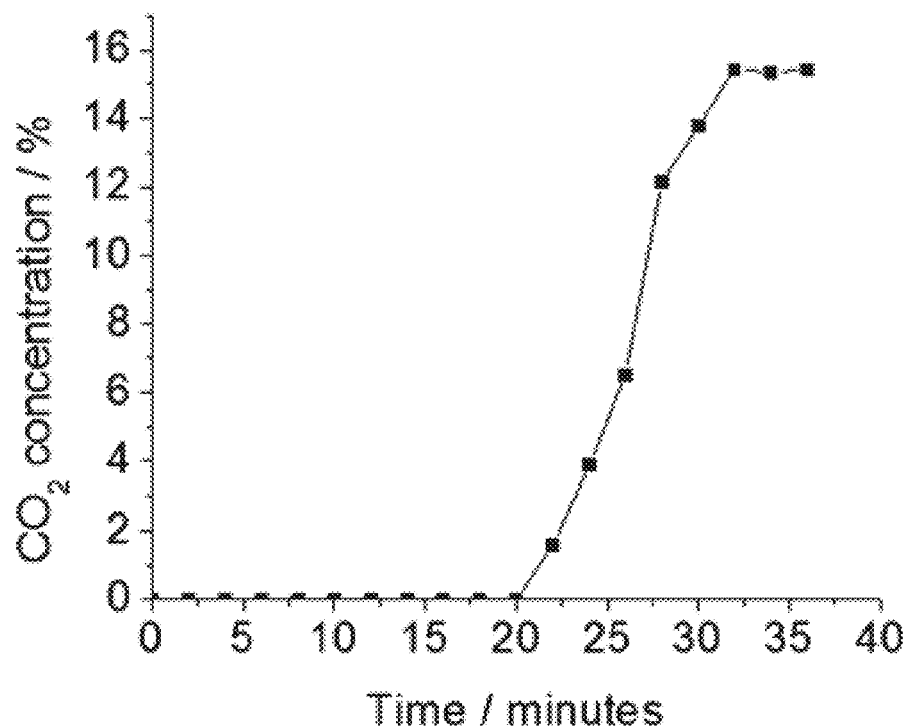

Following this separation cycle, another cycle was performed to investigate multicyclability and reproducibility. The $CO_2$ breakthrough curve is shown in FIG. 6G, which is very similar to that of the first cycle (FIG. 6F). For the first ca. 20 min, no carbon dioxide was detected, and after about 30 minutes the SSA effect was saturated. GC measurements of the effluent gas obtained by $N_2$ purging after discharge of the electrodes are shown in Table 2 (column 3). It can be seen from the data that the separation performance of the SSA module is repeatable over more than one cycle. For the 2nd cycle, carbon dioxide was detected 12 min after the gas mixture was flowed through the device and reached saturation at 22 min (taking into account the ca. 9 minutes the gas needs to flow through the device due to the dead volume). A breakthrough point is defined as the point in time at which the effluent gas concentration reaches 50% of the influent gas concentration. Based on this assessment, the breakthrough time of these experiments was 18 minutes. In the desorption half-cycle, the $CO_2$ concentration increased to 45.95%, which means that after the desorption half-cycle, 45.95% of the dead volume was carbon dioxide. This value is very close to the value measured for the first desorption half-cycle (46.61%), demonstrating good cycle-to-cycle repeatability.

In the adsorption half-cycle, the amount of carbon dioxide adsorbed due to the SSA effect can be calculated as 0.1 mL min$^{-1}$×18 min×15%=0.27 mL. In the desorption half-cycle, the amount desorbed by SSA effect caused the $CO_2$ concentration to rise from 15% to 46.28% (this is the average of 46.61% and 45.95%), therefore the amount desorbed can be calculated as 0.9 mL×(46.28%−15%)=0.281 mL. The two values are in excellent agreement, and the small difference between the adsorbed and desorbed amount is likely due to measurement inaccuracy. This inaccuracy is likely due to the fact that the sampled gas could only be measured every 2 minutes in the GC instruments used. The data confirms that the adsorbed $CO_2$ can be released completely during the discharge step. During the adsorption half-cycle, the amount of carbon dioxide was determined as n=pV/RT=0.011 mmol, where R is 62.36 mL mmHg K$^{-1}$ mmol$^{-1}$, T is 298 K, p is 760 mmHg and V is 0.27 mL. Since 0.290 g carbon material was used in the working (gas-exposed) electrode, the SSA sorption capacity can be calculated as 0.011 mmol/0.290 g=38 mmol kg$^{-1}$.

TABLE 2

| | $CO_2$ content of effluent gas after desorption | |
|---|---|---|
| Time (min) | $CO_2$ content (%) cycle 1 | $CO_2$ content (%) cycle 2 |
| 0 | 46.61 | 45.95 |
| 2 | 1.72 | 0.98 |
| 4 | 0 | 0 |

Figure 7A:
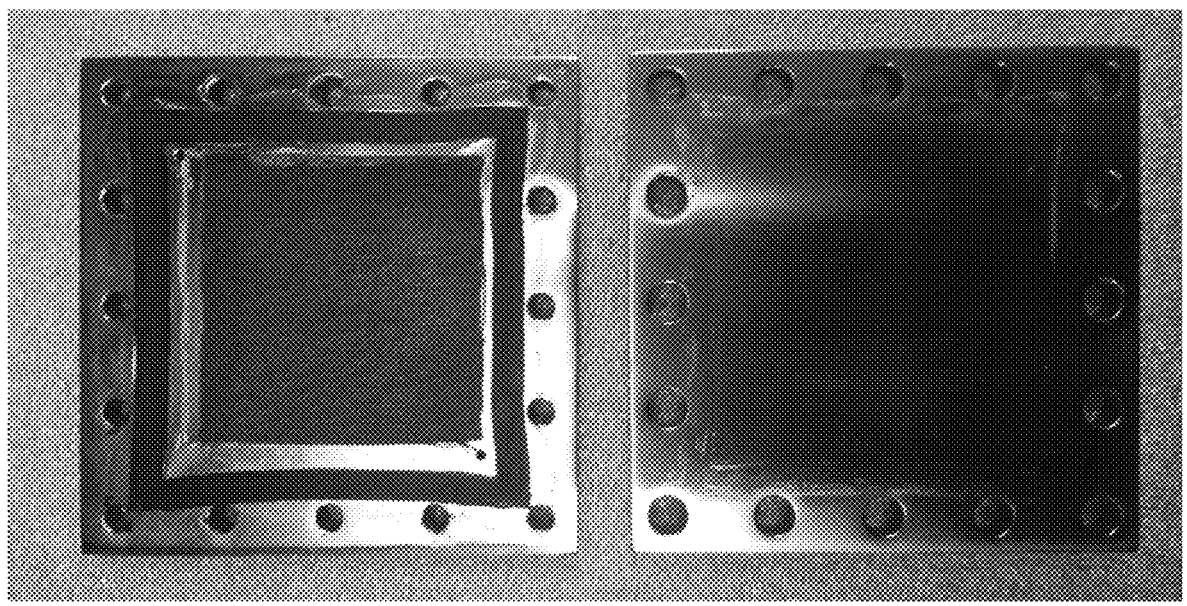
FIG. 7A is a photograph of pieces of an exemplary SSA gas separation module of the invention. On the left is a top current collecting plate with an attached gasket (outer dark ring) and a carbon mesh (inner dark mesh layer) which serves as a gas permeable layer. On the right is the bottom current collecting plate.
Figure 7B:
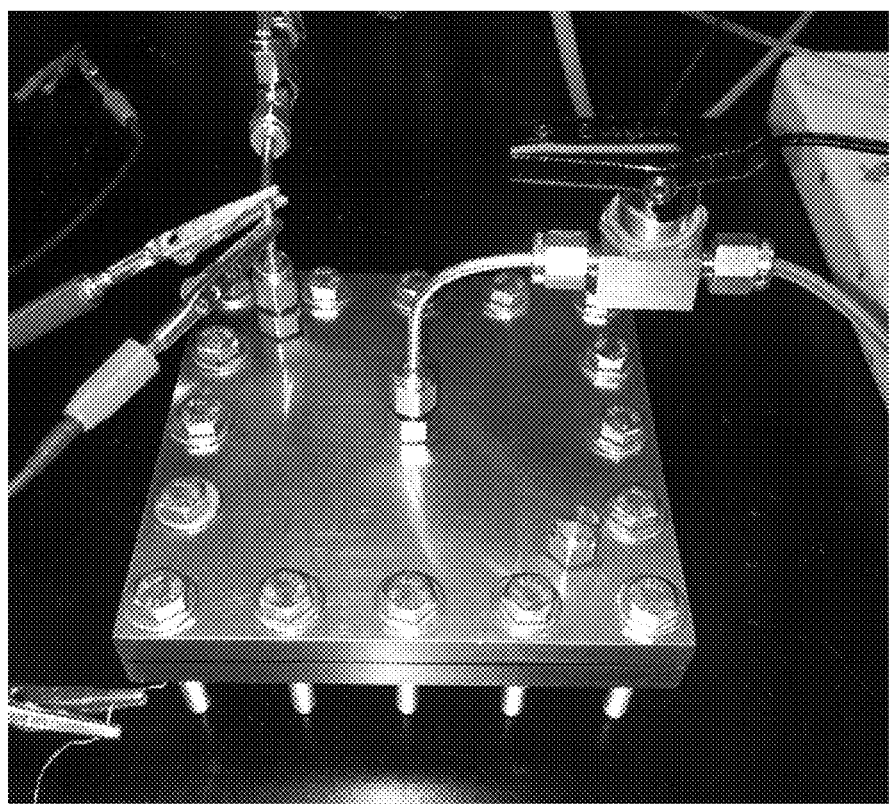
FIG. 7B is a photograph of an assembled exemplary SSA gas separation module of the invention comprising the pieces shown in FIG. 7A. The module is assembled in a single-stack radial flow configuration wherein gas is fed through the inlet (top left of the image) and flows out of the central gas outlet (center of the image).

Example 2: Construction and Testing of Different Electrodes within a SSA Gas Adsorption Module Materials and Methods An exemplary device of the invention was assembled substantially analogously to the device described in Example 1, with a few modifications, as depicted in FIGS. 7A and 7B. Substantially, titanium top and bottom plates (5"×5") replaced the aluminum plates from Example 1 and no graphite plates were used. The electrodes were fabricated as in Example 1, with a size of 7 cm×7 cm. FIG. 7A is a photograph depicting the top plate with rubber gasket encircling the carbon mesh and the bottom plate. The electrodes, and electrolyte soaked separator layer assembly was placed on top of the bottom plate depicted on the right in FIG. 7A, according to the procedures reported in Example 1. The layers were secured together with fasteners to form the assembled device depicted in FIG. 7B. A mixed gas source was connected to an inlet located distal to the center of the apparatus and an outlet valve was connected to the outlet located in the center of the apparatus, as shown in FIG. 7B.

Figure 7C:
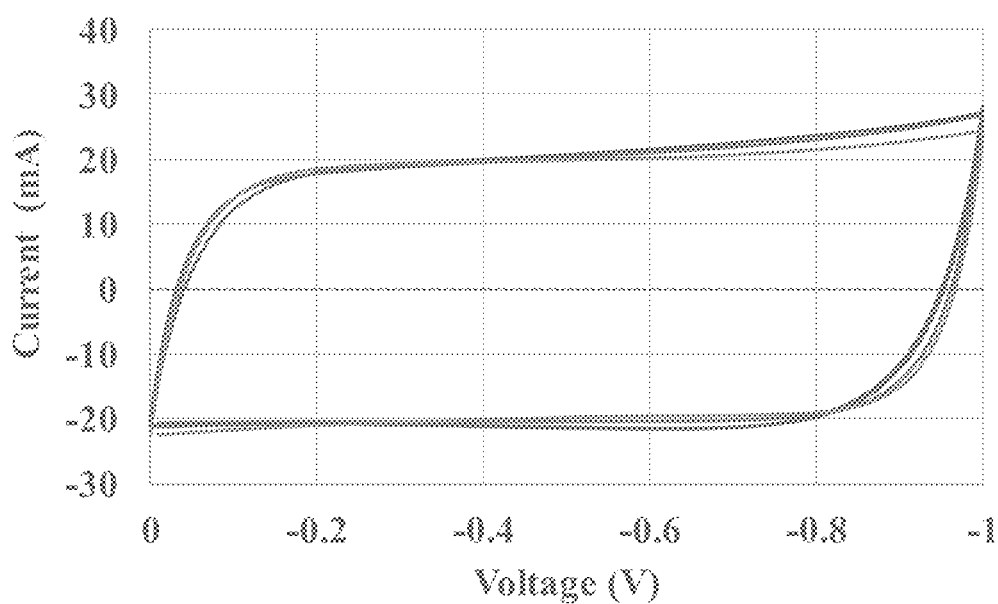
FIG. 7C is a graph reporting cyclic voltammetry of the SSA gas separation module depicted in FIG. 7B measured at varying force applied to the module.
Figure 7D:
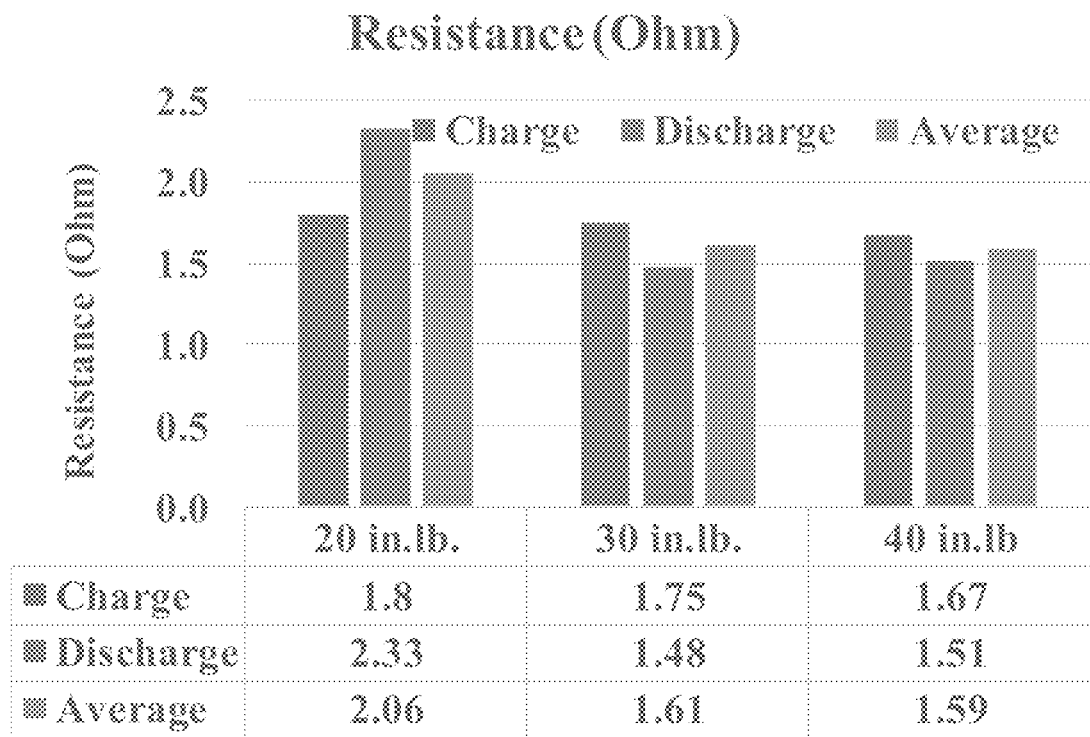
FIG. 7D is a set of graphs reporting the resistance measured during both charge and discharge of the SSA gas separation module depicted in FIG. 7B measured at varying force applied to the module.
Figure 7E:
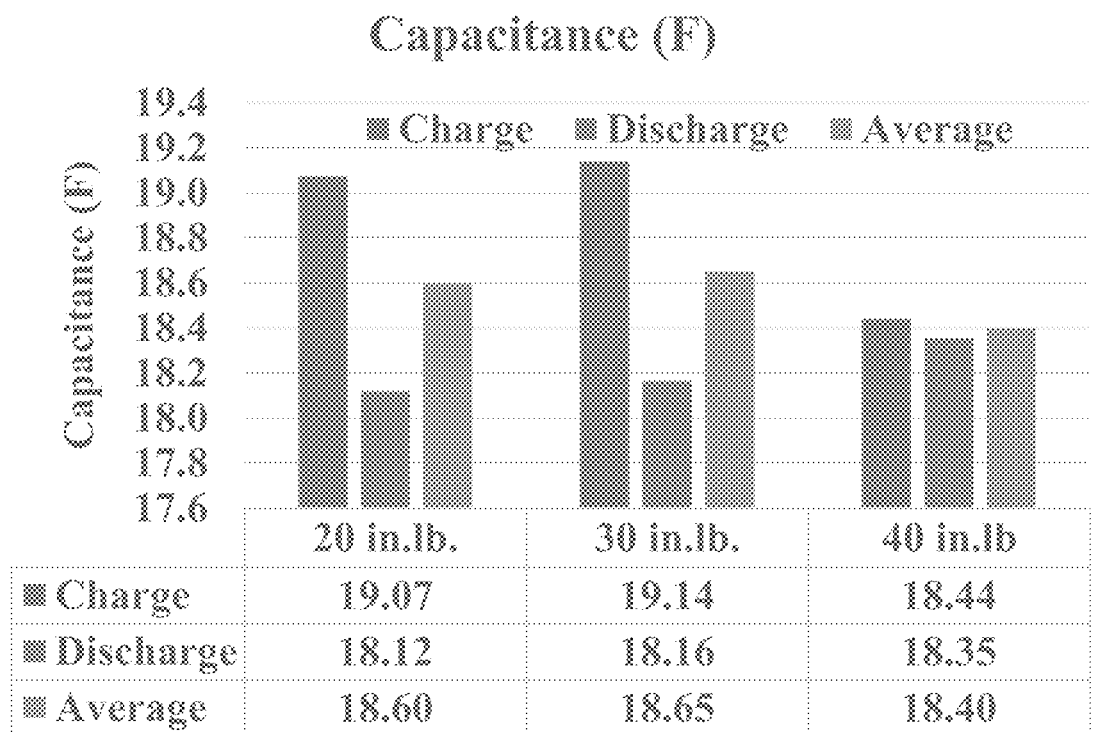
FIG. 7E is a set of graphs reporting capacitance of the SSA gas separation module depicted in FIG. 7B at varying force applied to the module.
Figure 7F:
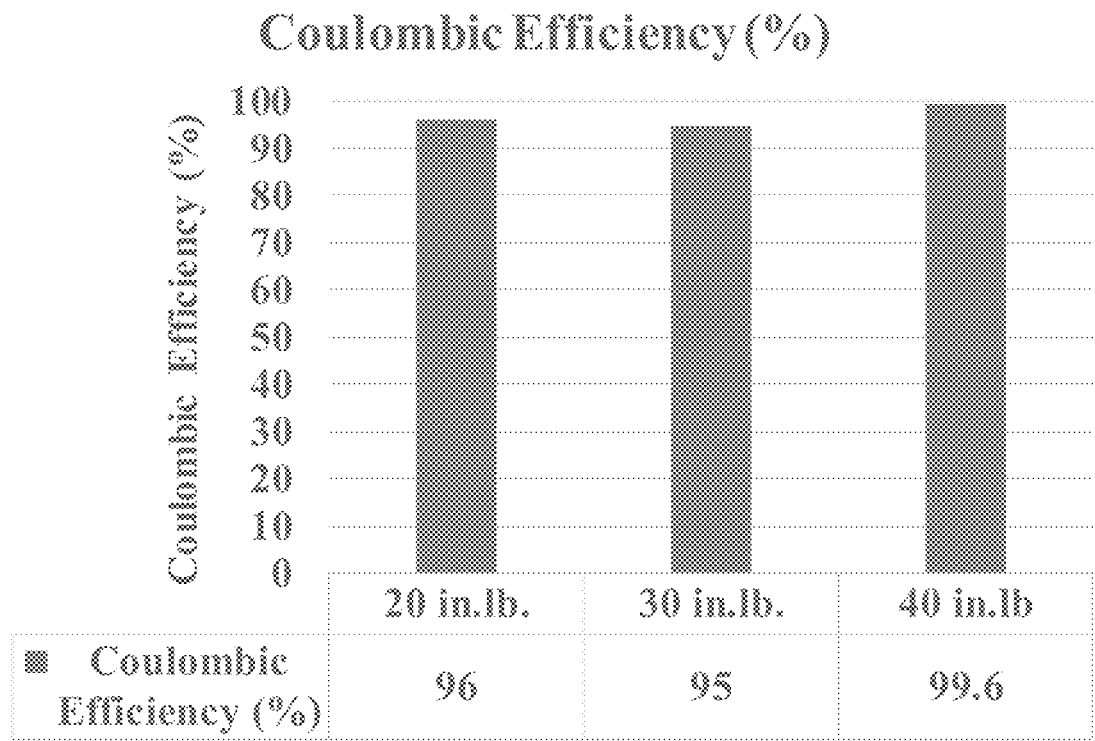
FIG. 7F is a graph comparing the coulombic efficiency of the SSA gas separation module depicted in FIG. 7B at varying force applied to the module.
Figure 7G:
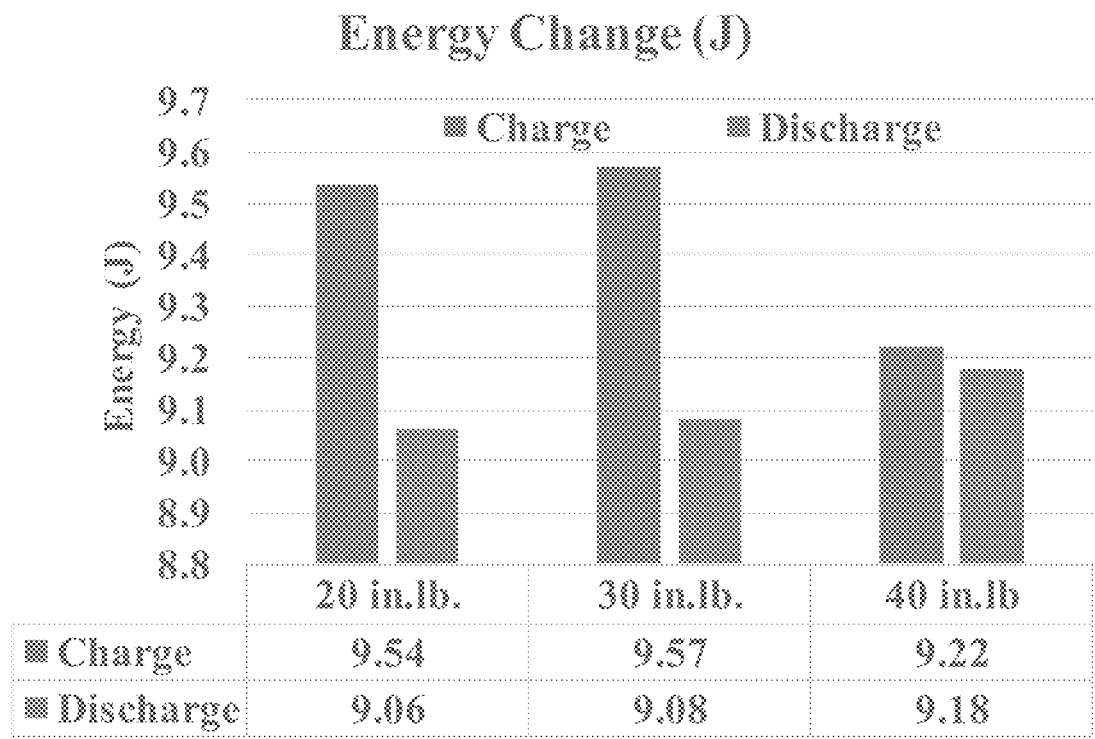
FIG. 7G is a graph comparing the change in energy between the charged and discharged state in the SSA gas separation module depicted in FIG. 7B at varying force applied to the module.
Figure 7H:
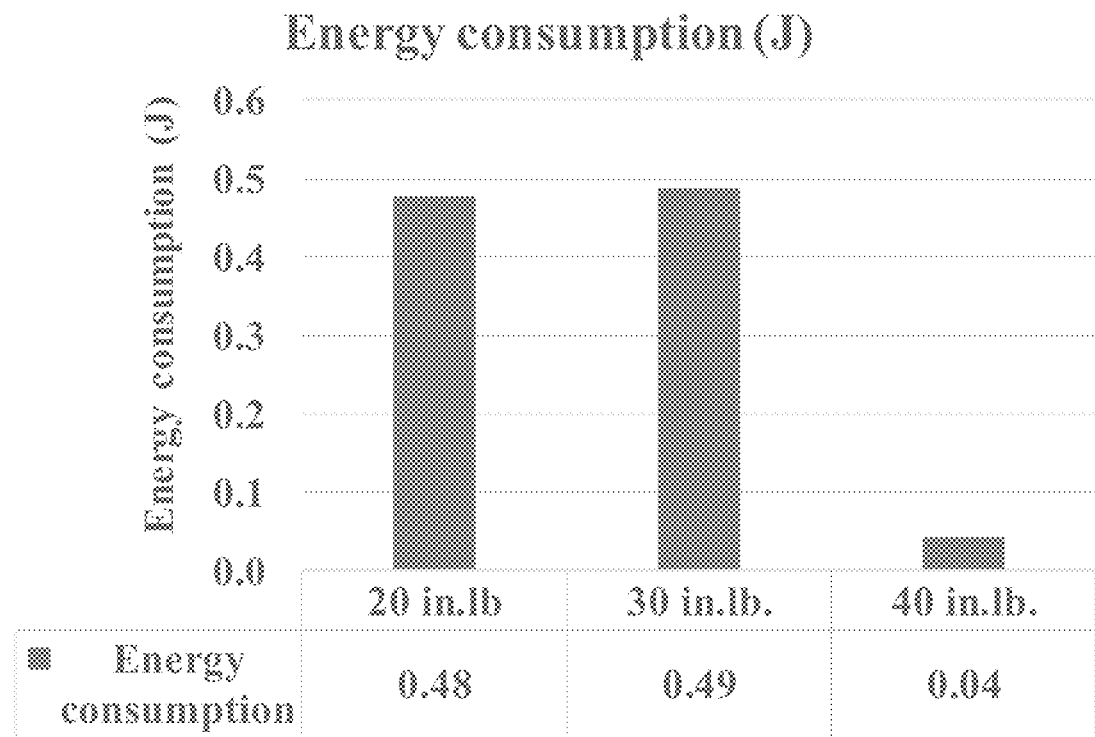
FIG. 7H is a graph comparing energy consumption in the SSA gas separation module depicted in FIG. 7B at varying force applied to the module.
Figure 7I:
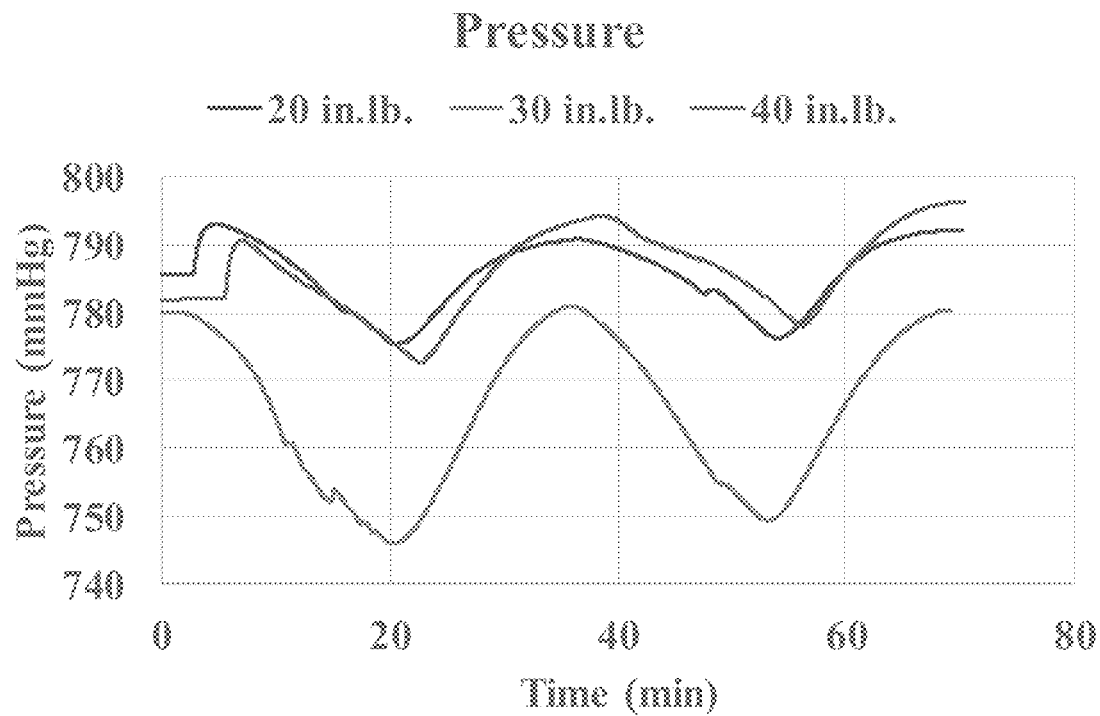
FIG. 7I is a graph measuring the pressure change in the SSA apparatus depicted in FIG. 7B over time when gas inlet and exit valves are closed and a 15% $CO_2$/85% $N_2$ gas mixture was used. The device was charged from 0 to 1V whereby the gas exposed electrode was used as the cathode. Pressure decreases were observed during the time the electrodes were charged, and pressure increases were observed during the time the electrodes were discharged. Pressure deceases indicate adsorption of $CO_2$, pressure increases indicate desorption of $CO_2$.
Figure 7J:
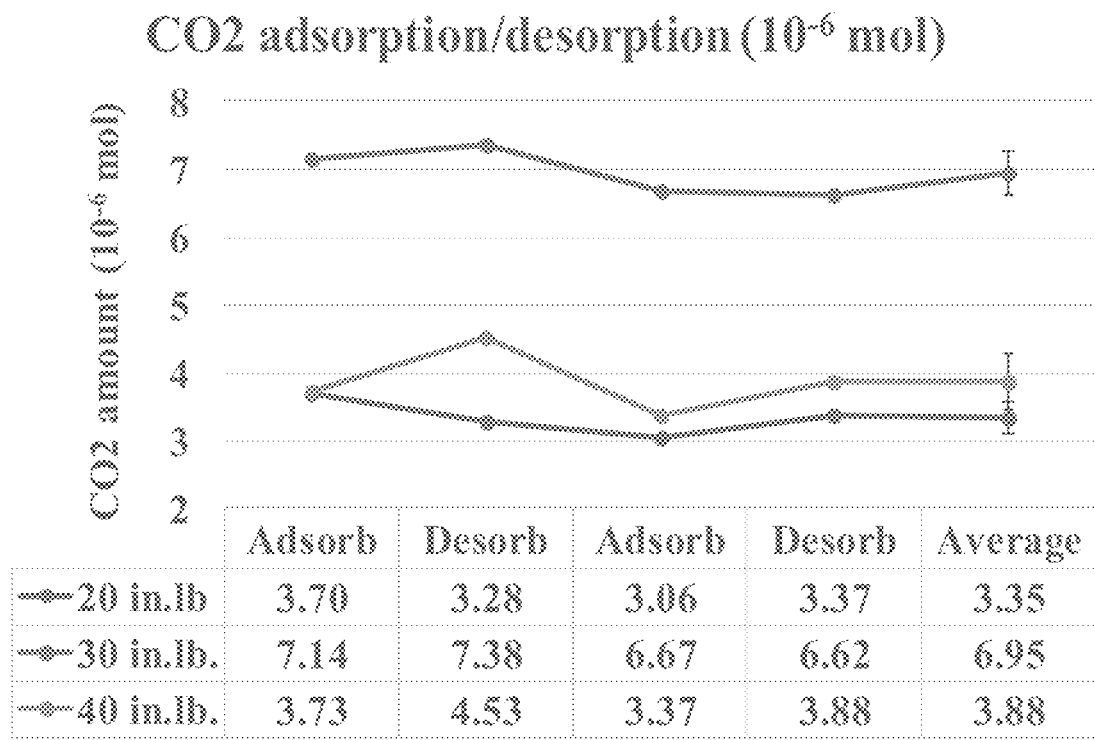
FIG. 7J is a graph of $CO_2$ adsorption and desorption across two cycles using the SSA gas separation module depicted in FIG. 7B at varying force applied to the module.
Figure 7K:
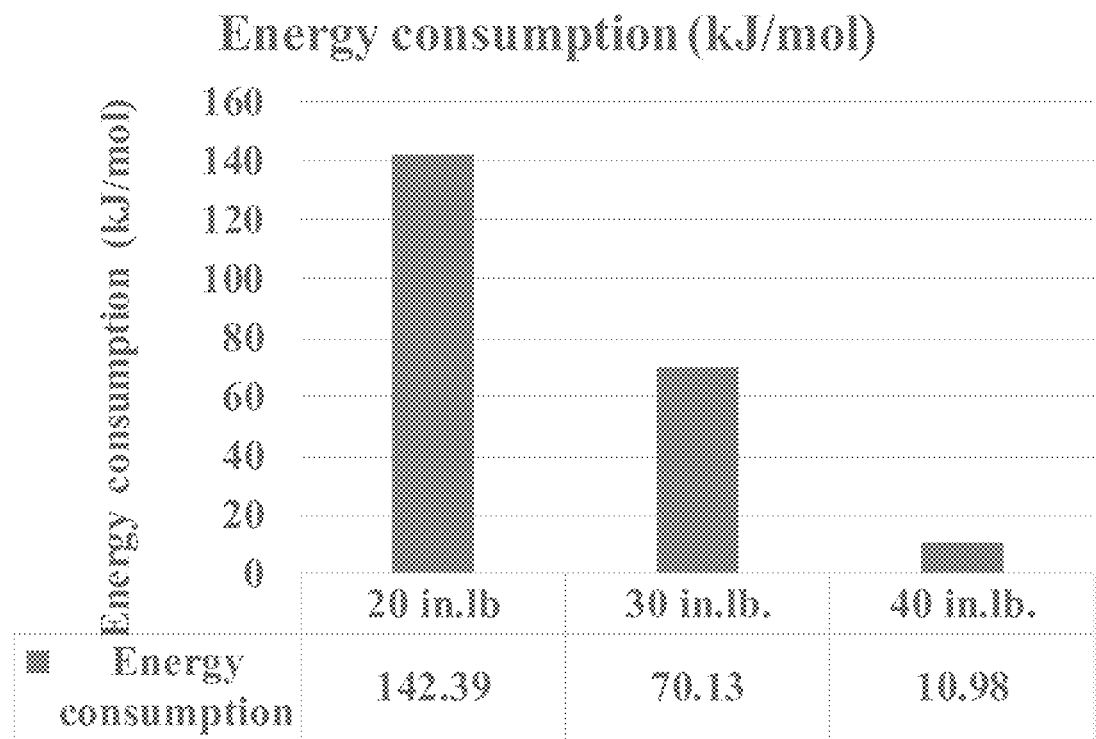
FIG. 7K is a graph comparing average energy consumption per amount of $CO_2$ adsorbed in the SSA gas separation module depicted in FIG. 7B as a function of the applied force to the module. It was found that the module to which a force of 40 in.lb. was applied was by far the most energy efficient.

The device was operated analogously to the one described in Example 1 using an 15% $CO_2$/85% $N_2$ gas mixture and an operating voltage of 1 V. FIG. 7C shows the cyclic voltammetry curves for the device with different amounts of torque applied to the fasteners that press the two titanium screws together (20, 30, and 40 inch pounds, respectively). For all torques the capacitive behavior was measured, but the exact capacitance slightly varied with the applied torque (FIG. 7E), and also slightly varied depending if the capacitance was measured from the charge or the discharge curve (FIG. 7E). The resistance in the device was measured with Impedance Spectroscopy and the results are shown in FIG. 7D. A low resistance was measured for all torques applied to the device whereby the resistance monotonically decreased from with increasing torque. Without being limited to any particular theory, this can be explained by reduced contact resistance at higher torques. The Coulomb efficiency was also determined from the charge discharge curves. The efficiency was very high (>95%) in experiments performed at torques of 20, 30, and 40 inch pounds; the efficiency was the highest for the experiment performed at 40 inch pounds (99.6%, FIG. 7F). The energy used to charge the capacitor, and the energy recovered by discharging the capacitor was also determined from the cyclovoltammetry experiments, and is shown in FIG. 7G. Nearly all of the energy used to charge the capacitor was recovered upon discharge. The overall energy consumption in a charge-discharge cycle (FIG. 7H) was determined from the energy changes (FIG. 7G). It is apparent that the energy consumption is the smallest for the experiment performed at 40 inch pounds which is likely due to the smaller contact resistance at this torque. Pressure changes were measured during the cyclovoltammetry experiments (with the gas inlet and outlet valves closed) and the results are depicted in FIG. 7I. It was observed that for all experiments the pressure decreased during charging, while the pressure increased when discharging showing that gas was adsorbed during the charging step, and gas was desorbed during the discharging step. The amount of adsorbed $CO_2$ was calculated from the pressure changes and the results are shown in FIG. 7J. The greatest amount of $CO_2$ was adsorbed at a torque of 30 inch pounds. The overall energy consumption of a charge-discharge cycle has been calculated from amount of $CO_2$ adsorbed and the energy spent, and the values are shown in FIG. 7K. The results show that the energy consumption decreases with increasing torque, and the lowest energy consumption (10.98 kJ/mol) was measured at a torque of 40 inch pounds.

Example 3: Tandem Gas Separation Systems

Figure 8A:
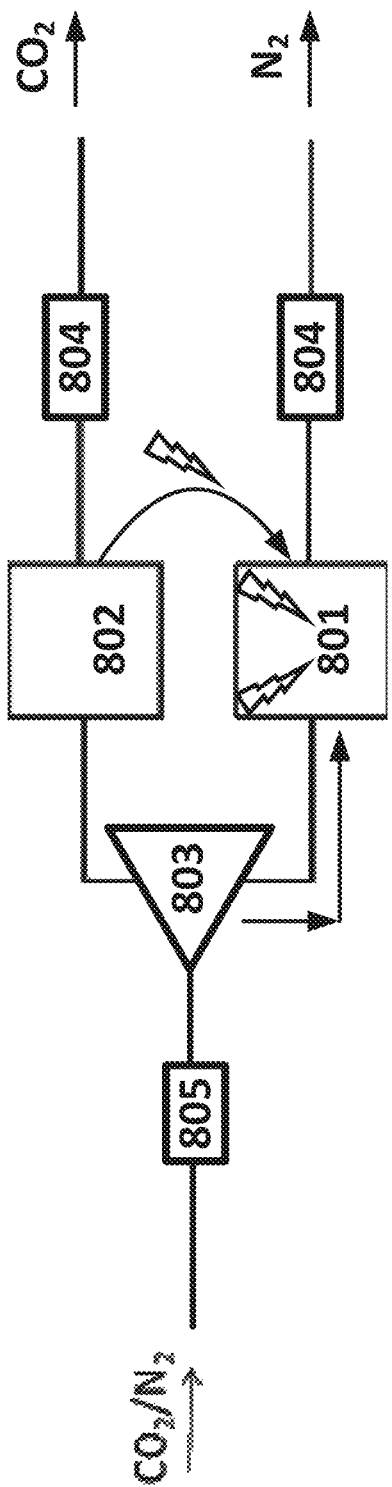
Figure 8B:
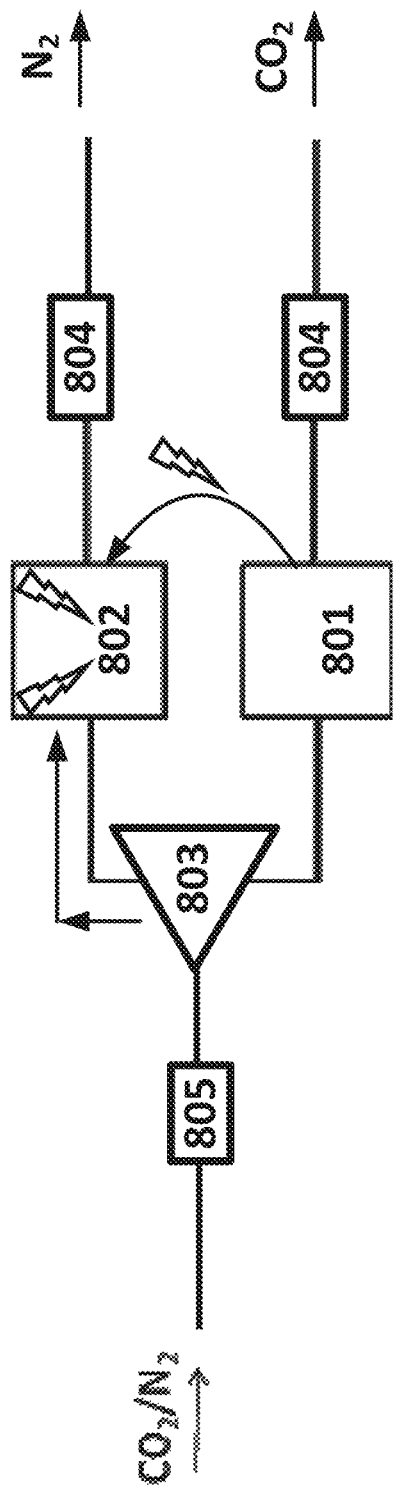

Two apparatuses of the invention 801, 802 can be coupled to produce a system that operates in continuous flow mode (FIGS. 8A-8B). In an exemplary system apparatus such as that illustrated in FIGS. 8A-8B, in a first state, a gas mixture (in this non-limiting example, $CO_2/N_2$) is directed to and only has access to a first apparatus 801. In this first state (FIG. 8A) the first apparatus 801 is in adsorption mode (charged) and a second apparatus 802 is in desorption mode (discharged). While charged, the electrode selectively adsorbs $CO_2$, allowing $N_2$ to pass through. When this apparatus 801 has absorbed $CO_2$ to the maximum possible capacity for the electrode, the gas access is closed.

The system can then be switched to a second state (FIG. 8B) wherein the gas access to apparatus 801 is closed, apparatus 801 is discharge, gas access is redirected to apparatus 802 and apparatus 802 is charged. The first apparatus 801 is discharged, thereby desorbing the $CO_2$. This releases the $CO_2$ from the first apparatus 801, which can stream out of the system and optionally collected. Meanwhile, gas can stream through apparatus 802, whereby $CO_2$ is selectively adsorbed and $N_2$ is allowed to pass through until it is saturated with $CO_2$. Gas access to apparatus 802 is then closed, the apparatus 802 is discharged, and $CO_2$ is desorbed from the second apparatus 802. Gas access is then passed back to apparatus 801, reverting the system back to the first state. This process can continue indefinitely such that one of the apparatuses is being fed a mixed gas stream and is charged and adsorbing a gas from the mixture while the other apparatus is discharged and is desorbing and streaming the previously adsorbed gas out of the apparatus. In certain embodiments, energy can be conserved by shuttling the charge between the apparatuses 801 and 802. In some exemplary embodiments, the device can optionally further comprise one or more flow meters 804 and optionally a mass flow controller 805. The gas access to the apparatuses can be switched by a three-way valve 803. The amount of separated gas per time and sorbent mass can be measured using two mass flow meters 804 and, optionally, a mass flow controller 805.

The disclosures of each and every patent, patent application, and publication cited herein are hereby incorporated herein by reference in their entireties.

Although the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. An apparatus for separating a first gas at least partially from a gaseous mixture, the apparatus comprising a gas permeable layer transporting the gaseous mixture comprising the first gas, a first electrode, a second electrode, and a separator comprising an electrolyte,
   wherein:
   the gas permeable layer is adapted and configured to allow for flow of the gaseous mixture and the gas permeable layer comprises a first surface and a second surface opposite to one another;
   the first electrode comprises a first surface and a second surface opposite to one another;
   the second electrode comprises a first surface and a second surface opposite to one another; and
   wherein:
   the second surface of the gas permeable layer abuts the first surface of the first electrode;
   the separator is disposed between, and in physical contact with, the second surface of the first electrode and the first surface of the second electrode;
   wherein,
   when the first and second electrodes are capacitively charged by applying a voltage to the apparatus, the first gas is preferentially adsorbed in the apparatus from the gaseous mixture, and
   when the first and the second electrodes are capacitively discharged, the first gas is desorbed from the apparatus and vented from the apparatus via the gas permeable layer,
   whereby the first gas and the gaseous mixture do not undergo any electrochemical redox process, and whereby the first gas is at least partially separated from the gaseous mixture.

2. The apparatus of claim 1, wherein the gas permeable layer further comprises an electrically conducting material that is permeable to the gaseous mixture.

3. The apparatus of claim 1, wherein the gas permeable layer comprises at least one selected from a carbon cloth, carbon mesh, carbon felt, carbon paper, metallic foam, metallic mesh, and metallic paper.

4. The apparatus of claim 3, wherein the gas permeable layer comprises at least one selected from titanium foam and titanium mesh.

5. The apparatus of claim 1, wherein the gas permeable layer further comprises a solid electrically conducting material defining one or more fluidic channels that allow for gaseous flow between the gas permeable layer and the first surface of the first electrode.

6. The apparatus of claim 1, wherein the first and second electrodes independently comprise at least one selected from high surface area carbon, porous metals, electrically conducting porous metal-organic frameworks, and electrically conducting porous polymers.

7. The apparatus of claim 6, wherein the first and second electrodes independently comprise at least one selected from activated carbon, titanium, copper, silver, gold, steel, aluminum and TP-COF.

8. The apparatus of claim 6, wherein the first and second electrodes do not comprise any compounds capable of catalytically oxidizing or reducing a gas contained within the gaseous mixture.

9. The apparatus of claim 1, further comprising at least one gas inlet and at least one gas outlet wherein the at least one gas inlet and at least one gas outlet are in fluidic communication with the gas permeable layer.

10. The apparatus of claim 1, further comprising a first current collector and a second current collector, wherein the first current collector abuts and spans the first surface of the gas permeable layer, and wherein the second current collector abuts and spans the second surface of the second electrode.

11. The apparatus of claim 10, further comprising at least one gas inlet and at least one gas outlet wherein the at least one gas inlet and at least one gas outlet are in fluidic communication with the gas permeable layer.

12. The apparatus of claim 11, further comprising a gasket with a thickness that is approximately the sum of the thicknesses of the gas permeable layer, first electrode, second electrode and separator, wherein the gasket is in physical contact with the first current collector and second current collector, and surrounds the length and width dimensions of the gas permeable layer, the first and second electrodes and the separator, whereby a system formed by the gasket and first and second current collectors is sealed against liquid and/or gas exchange, except through the at least one gas inlet and at least one gas outlet.

13. The apparatus of claim 1, further comprising a first corrosion resistant layer, a second corrosion resistant layer, a first current collector and a second current collector,
wherein:
the first corrosion resistant layer comprises a first surface and a second surface opposite to one another;
the second corrosion resistant layer comprises a first surface and a second surface opposite to one another; and
wherein the first current collector abuts and spans the first surface of the first corrosion resistant layer, the second surface of the first corrosion resistant layer abuts and spans the first surface of the gas permeable layer, the first surface of the second corrosion resistant layer abuts and spans the second surface of the second electrode and the second current collector abuts and spans the second surface of the second electrode.

14. The apparatus of claim 13, wherein the first and second current collectors independently further comprise a metal layer, plate and/or sheet.

15. The apparatus of claim 13, further comprising at least one gas inlet and at least one gas outlet wherein the at least one gas inlet and at least one gas outlet are in fluidic communication with the gas permeable layer.

16. The apparatus of claim 15, further comprising a gasket with a thickness that is approximately the sum of the thicknesses of the gas permeable layer, first electrode, second electrode and separator, wherein the gasket is in physical contact with the second surface of the first corrosion resistant layer and the first surface of the second corrosion resistant layer, and surrounds the length and width dimensions of the gas permeable layer, the first and second electrodes and the separator, whereby a system formed by the gasket and first and second corrosion resistant layers is sealed against liquid and/or gas exchange, except through the at least one gas inlet and at least one gas outlet.

17. The apparatus of claim 1, wherein the apparatus is incorporated into a device configuration selected from a linear flow design, a serpentine flow design, a radial flow design, a spirally-wound design, and a pouch design.

18. An apparatus for separating a first gas at least partially from a first gaseous mixture and a second gas from a second gaseous mixture, the apparatus comprising a first gas permeable layer transporting the first gaseous mixture comprising the first gas, a second gas permeable layer transporting the second gaseous mixture comprising the second gas, a first electrode, a second electrode, and a separator comprising an electrolyte,
wherein:
the first gas permeable layer is adapted and configured to allow for flow of the first gaseous mixture and the first gas permeable layer comprises a first surface and a second surface opposite to one another;
the second gas permeable layer is adapted and configured to allow for flow of the second gaseous mixture and the second gas permeable layer comprises a first surface and a second surface opposite to one another;
the first electrode comprises a first surface and a second surface opposite to one another;
the second electrode comprises a first surface and a second surface opposite to one another; and
wherein:
the second surface of the gas permeable layer abuts the first surface of the first electrode;
the first surface of the second gas permeable layer abuts the second surface of the second electrode;
the separator is disposed between, and in physical contact with, the second surface of the first electrode and the first surface of the second electrode;
wherein, when the first and second electrodes are capacitively charged by applying a voltage to the apparatus, the first gas is preferentially adsorbed into the first electrode from first the gaseous mixture and the second gas is preferentially adsorbed in to the second electrode from the second gaseous mixture, and
when the first and the second electrodes are capacitively discharged, the first gas and second gas are desorbed from the apparatus and vented from the apparatus via the first gas permeable layer and second gas permeable layer respectively,
whereby the first gas, second gas, first gaseous mixture and second gaseous mixture do not undergo any electrochemical redox process, and whereby the first gas is at least partially separated from the first gaseous mixture and the second gas is at least partially separated from the second gaseous mixture.

19. A method of separating a first gas at least partially from at least one other gas in a gaseous mixture, the method comprising flowing the gaseous mixture through the apparatus of claim 1, wherein a varying voltage is applied to the apparatus, wherein the first and second electrodes are charged capacitively and the first gas and any of the other gases in the gaseous mixture do not undergo any electrochemical redox process.

20. The method of claim 19, wherein the first gas and the at least one other gas have different absorptivities within the apparatus when the voltage is applied to the apparatus.

21. A system for separating at least one gas from a gaseous mixture, the system comprising at least two of the apparatuses of claim 1 connected in series, whereby the gas permeable layers of each apparatus are in fluidic communication.

22. A device for separating a gas at least partially from a gaseous mixture, the device comprising at least two apparatuses of claim 1, a gas feed and a multi-way valve, wherein the gas feed is in fluidic communication with the multi-way valve which is in fluidic communication with the at least two apparatuses, such that the multi-way valve directs gas flow from the gas feed to a single apparatus at any time.

23. The device of claim 22, wherein the at least two apparatuses are electrically connected such that an applied voltage can be shuttled from one apparatus to another.

* * * * *